United States Patent
Oka et al.

(10) Patent No.: US 6,727,940 B1
(45) Date of Patent: Apr. 27, 2004

(54) IMAGE DISTRIBUTING SYSTEM

(75) Inventors: Hiroto Oka, Kawasaki (JP); Yoshihiro Ishida, Yokohama (JP); Tsuneyoshi Takagi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/363,259

(22) Filed: Jul. 29, 1999

(30) Foreign Application Priority Data

Jul. 31, 1998 (JP) .......................................... 10-218121
Jul. 2, 1999 (JP) .......................................... 11-189728

(51) Int. Cl.⁷ ........................ H04N 5/232; H04N 11/00; H04N 7/00
(52) U.S. Cl. ............... 348/211.3; 348/552; 348/211.99; 348/211.8
(58) Field of Search ........................... 340/211.3, 14.09, 340/38, 39, 36, 143, 552, 207.1, 207.11, 211.99, 211.8, 211.7, 211.9, 218.1; 709/203, 211

(56) References Cited

U.S. PATENT DOCUMENTS

| | | | | |
|---|---|---|---|---|
| 5,757,424 A | * | 5/1998 | Frederick | 348/218.1 |
| 5,793,367 A | * | 8/1998 | Taguchi | 345/756 |
| 5,929,904 A | * | 7/1999 | Uchida | 348/211.7 |
| 6,008,837 A | * | 12/1999 | Yonezawa | 348/211.8 |
| 6,034,716 A | * | 3/2000 | Whiting et al. | 348/36 |
| 6,133,941 A | * | 10/2000 | Ono | 348/14.05 |
| 6,545,708 B1 | * | 4/2003 | Tamayama et al. | 348/211.8 |
| 6,567,121 B1 | * | 5/2003 | Kuno | 348/211.3 |
| 2001/0019355 A1 | * | 9/2001 | Koyanagi et al. | 348/36 |
| 2001/0045983 A1 | * | 11/2001 | Okazaki et al. | 348/211 |
| 2003/0025803 A1 | * | 2/2003 | Nakamura et al. | 348/218.1 |

* cited by examiner

Primary Examiner—Wendy R. Garber
Assistant Examiner—John M Villecco
(74) Attorney, Agent, or Firm—Robin, Blecker & Daley

(57) ABSTRACT

This invention allows a user to simultaneously control geometric parameters for a camera and suppresses a deterioration in the image quality of distributed video images while keeping the cost low. The invention includes an image sensing area calculation unit for calculating a minimum image sensing area including required areas from clients, a required video image forming unit for forming required video images by extracting video images of the respective required areas from a video image of the image sensing area which is sensed, and a video image transmission I/F for distributing the formed required video images to the respective clients. Only the minimum area including the respective required areas is sensed, and video images of the respective required areas are cut from the video image and distributed to the respective users, thereby allowing a plurality of users to simultaneously control the camera and obtain video images at desired viewpoints and view angles. In addition, since only one camera is used, the required cost can be kept low, and the electronic zoom magnifications of video images to be distributed can be suppressed low, thereby minimizing a deterioration in the image quality of each required video image.

27 Claims, 25 Drawing Sheets

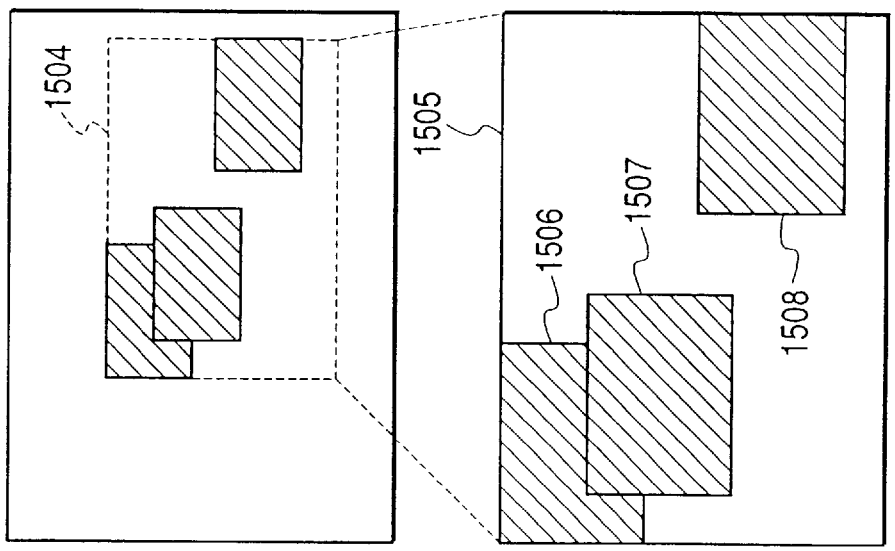
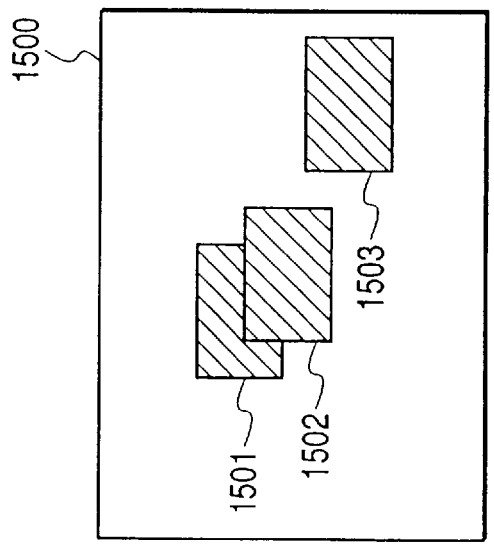

FIG. 16

ONE FIELD {

| REQUIRED AREA ID |
| --- |
| HORIZONTAL AXIS COORDINATE OF LEFT-END OF REQUIRED AREA |
| HORIZONTAL AXIS COORDINATE OF RIGHT-END OF REQUIRED AREA |
| VERTICAL AXIS COORDINATE OF UPPER-END OF REQUIRED AREA |
| VERTICAL AXIS COORDINATE OF LOWER-END OF REQUIRED AREA |
| REQUIRED AREA ID |
| HORIZONTAL AXIS COORDINATE OF LEFT-END OF REQUIRED AREA |
| HORIZONTAL AXIS COORDINATE OF RIGHT-END OF REQUIRED AREA |
| VERTICAL AXIS COORDINATE OF UPPER-END OF REQUIRED AREA |
| VERTICAL AXIS COORDINATE OF LOWER-END OF REQUIRED AREA |
| ⋮ |

| PAN ANGLE | ZOOM MAGNIFICATION |
|---|---|
| 80° | 1.00 |
| 79° | 1.04 |
| 78° | 1.08 |
| ⋮ | ⋮ |

IMAGE DISTRIBUTING SYSTEM

BACKGROUND OF THE INVENTION

1. Field of the Invention

The present invention relates to a video image distributing system for displaying video images sensed by a camera whose parameters are remotely controlled by users in remote places.

2. Related Background Art

In a conventional system for distributing video images sensed by a given camera or the like to a plurality of remote points through a network to display them, a camera control system is known, which allows the users at the respective points to control geometric parameters (pan angle, tilt angle, zoom magnification, and the like) for the camera so as to obtain video images at desired points and view angles at the points.

In a conventional camera control system of this type, however, a plurality of users cannot simultaneously control the geometric parameters for the camera. This problem may be solved by installing a plurality of cameras in the same place. In this case, however, a high cost is required to prepare the plurality of cameras, posing a new problem.

SUMMARY OF THE INVENTION

The present invention has been made to solve this problem, and has as its object to allow a plurality of users to simultaneously obtain desired video images and minimize a deterioration in the image quality of video images distributed to the respective users while keeping the cost low by using one camera.

It is another object of the present invention to satisfy the maximum number of requirements in accordance with the contents of requirements from users and minimize a deterioration in the image quality of video images distributed to the respective users.

It is still another object of the present invention to efficiently manage camera control rights and minimize a deterioration in image quality by using statistical information about areas (directions of optical axis of a camera and zoom magnifications) desired by users.

In order to achieve at least one of the above objects, according to one aspect of the present invention, there is provided an image distributing system for distributing images from a camera at least one of whose panning, tilting, and zooming can be controlled, through a network, comprising receiving means for receiving information about an image sensing area of the camera which is required by each of a plurality of client terminals, control means for controlling the camera to include the image sensing areas of the camera which are required from the respective client terminals, and distributing means for cutting images of the image sensing areas of the camera which are required from the respective client terminals, from an image sensed by the cut camera controlled by the control means and distributing the images to the respective client terminals.

According to another aspect of the present invention, there is provided a client terminal for requiring distribution of an image from a camera whose panning, tilting, and zooming can be controlled, comprising designation means for designating acquiring of an image of a desired image sensing area of the camera, acquiring means for acquiring information about a current image sensing area of the camera, and display means for displaying a first frame indicating an area which can be sensed by controlling panning, tilting, and zooming of the camera, a second frame displayed in the first frame and indicating an image sensing area designated by the designation means, and a third frame displayed in the first frame and indicating a current image sensing area of the camera which is acquired by the acquiring means.

According to still another aspect of the present invention, there is provided an image distributing method of distributing images from a camera at least one of whose panning, tilting, and zooming can be controlled, through a network, comprising a receiving step of loading information about an image sensing area of the camera which is required by each of a plurality of client terminals, a control step of controlling the camera to include the image sensing areas of the camera which are required from the respective client terminals, and a distributing step of extracted images of the image sensing areas of the camera which are required from the respective client terminals, from an image sensed by the camera controlled in the control step and distributing the extracted images to the respective client terminals.

According to still another aspect of the present invention, there is provided a method for a client terminal for requiring distribution of an image from a camera whose panning, tilting, and zooming can be controlled, comprising a designation step of designating loading of an image of a desired image sensing area of the camera, an acquiring step of acquiring information about a current image sensing area of the camera, and a display step of displaying a first frame indicating an area which can be sensed by controlling panning, tilting, and zooming of the camera, a second frame displayed in the first frame and indicating an image sensing area designated in the designation step, and a third frame displayed in the first frame and indicating a current image sensing area of the camera which is acquired in the acquiring step.

According to still another aspect of the present invention, there is provided a recording medium for computer-readably storing a program for executing an image distributing method of distributing images from a camera at least one of whose panning, tilting and zooming can be controlled, through a network, the image distributing method comprising a receiving step of loading information about an image sensing area of a camera which is required by each of a plurality of client terminals, a control step of controlling the camera to include the image sensing areas of the camera which are required from the respective client terminals, and a distributing step of cutting images of the image sensing areas of the camera which are required from the respective client terminals, from an image sensed by the camera controlled in the control step and distributing the cut images to the respective client terminals.

According to still another aspect of the present invention, there is provided a recording medium for computer-readably storing a program for executing a method for a client terminal for requiring distribution of an image from a camera whose panning, tilting, and zooming can be controlled, the method comprising a designation step of designating acquiring of an image of a desired image sensing area of the camera, an acquiring step of acquiring information about a current image sensing area of the camera, and a display step of displaying a first frame indicating an area which can be photographed by controlling panning, tilting, and zooming of the camera, a second frame displayed in the first frame and indicating an image sensing area designated in the designation step, and a third frame displayed in the first frame and indicating a current image sensing area of the camera which is acquired in the acquiring step.

The above and other objects, features, and advantages of the present invention will be apparent from the following detailed description in conjunction with the accompanying drawings and the appended claims.

BRIEF DESCRIPTION OF THE DRAWINGS

FIGS. 15A and 15B are views for explaining required areas and image sensing area in the first embodiment;

FIG. 16 is a view showing an example of the data structure of a required area storage unit in the first embodiment;

DETAILED DESCRIPTION OF THE PREFERRED EMBODIMENTS

An embodiment of the present invention will be described below with reference to the accompanying drawings.

Figure 13:
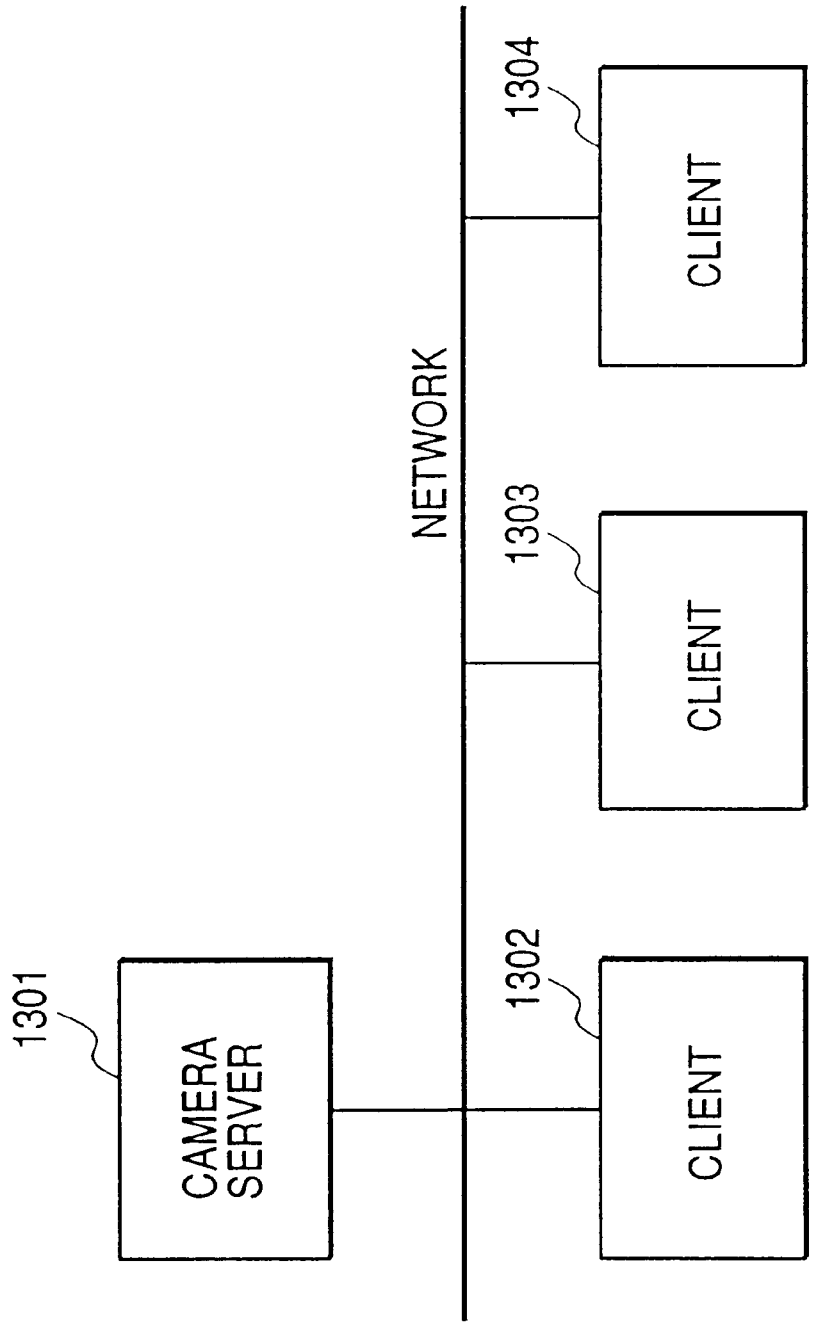
FIG. 13 is a block diagram showing the schematic arrangement of a camera control system according to is embodiment.

A camera control system according to the first embodiment has the arrangement shown in FIG. 13.

Referring to FIG. 13, a camera server 1301 includes a camera capable of sensing, for example, a video image of 640×480 pixels and has the function of distributing the video image sensed by the camera.

Computer terminals 1302, 1303, 1304, . . . which are used by users, are connected to the camera server 1301 through a network. Each of these terminals (to be referred to as the clients hereinafter) can control geometric parameters (a pan angle, tilt angle, zoom magnification, and the like) for the camera by outputting control commands to the camera server 1301, and has the function of receiving the distributed video image and displaying it.

Figure 14:
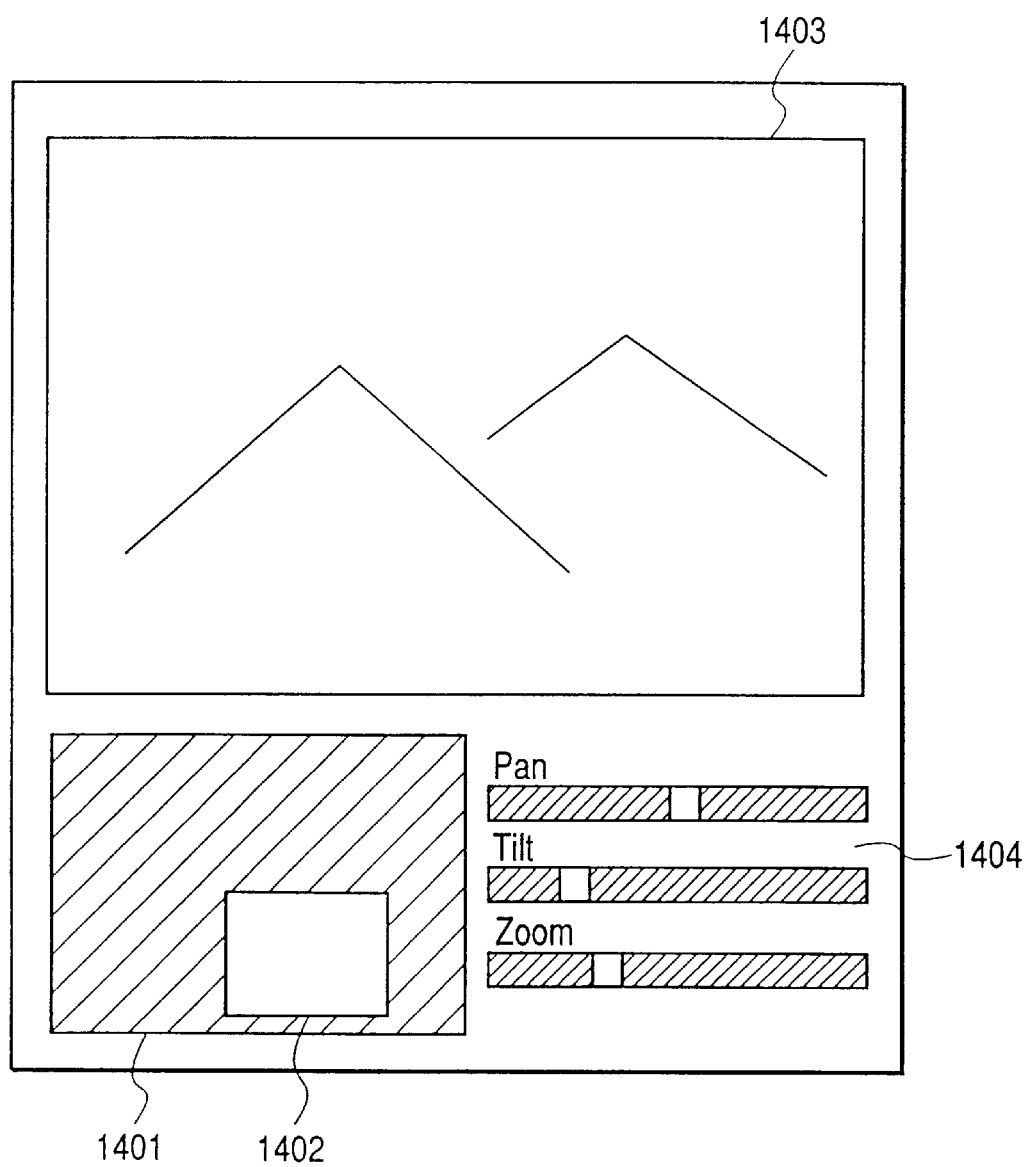
FIG. 14 is a view showing an example of a GUI window on a client according to the first embodiment.

For example, a GUI window like the one shown in FIG. 14 is displayed on the display of each of the clients 1302, 1303, 1304, . . . Referring to FIG. 14, in a range 1401 (to be referred to as an image-sensible range hereinafter), image sensing operation can be performed by changing geometric parameters for the camera by the camera server 1301. An area 1402 (to be referred to as a required area hereinafter) is an area, in the image-sensible range 1401, which the client user wants to sense. For the sake of simplicity, assume that the required area in this embodiment is a rectangle having an aspect ratio of 640:480. A video image (to be referred to as a required video image) 1403 is included in the required area 1402.

A scroll bar 1404 is used to change the position or size of the required area 1402. Each of the users of the clients 1302, 1303, 1304, . . . sets desired geometric parameters by using the scroll bar 1404 and can obtain the video image of the required area 1402 designated by the parameters, i.e., the required video image 1403. Alternatively, the user can directly designate the position and size of the required area 1402 by dragging a mouse (not shown) in the image-sensible range 1401.

The camera server 1301 calculates an area (to be referred to as an image sensing area hereinafter) including all the required areas 1402 and exhibiting the minimum view angle on the basis of the information of the required area 1402 designated by each client user. FIGS. 15A and 15B are views for explaining this image sensing area. FIG. 15A shows an image-sensible range 1500 (corresponding to the image-sensible range 1401 in FIG. 14) and required areas 1501, 1502, and 1503 required by the respective users. In this case, the minimum image sensing area satisfying all the video image acquiring requirements from the respective client users is an area 1504 indicated by the dotted lines in FIG. 15B. When the area 1504 is calculated, the camera is controlled to perform image sensing operation in the image sensing area 1504 by changing the geometric parameters for the camera, as indicated by reference numeral 1505 in FIG. 15B.

Figure 1:
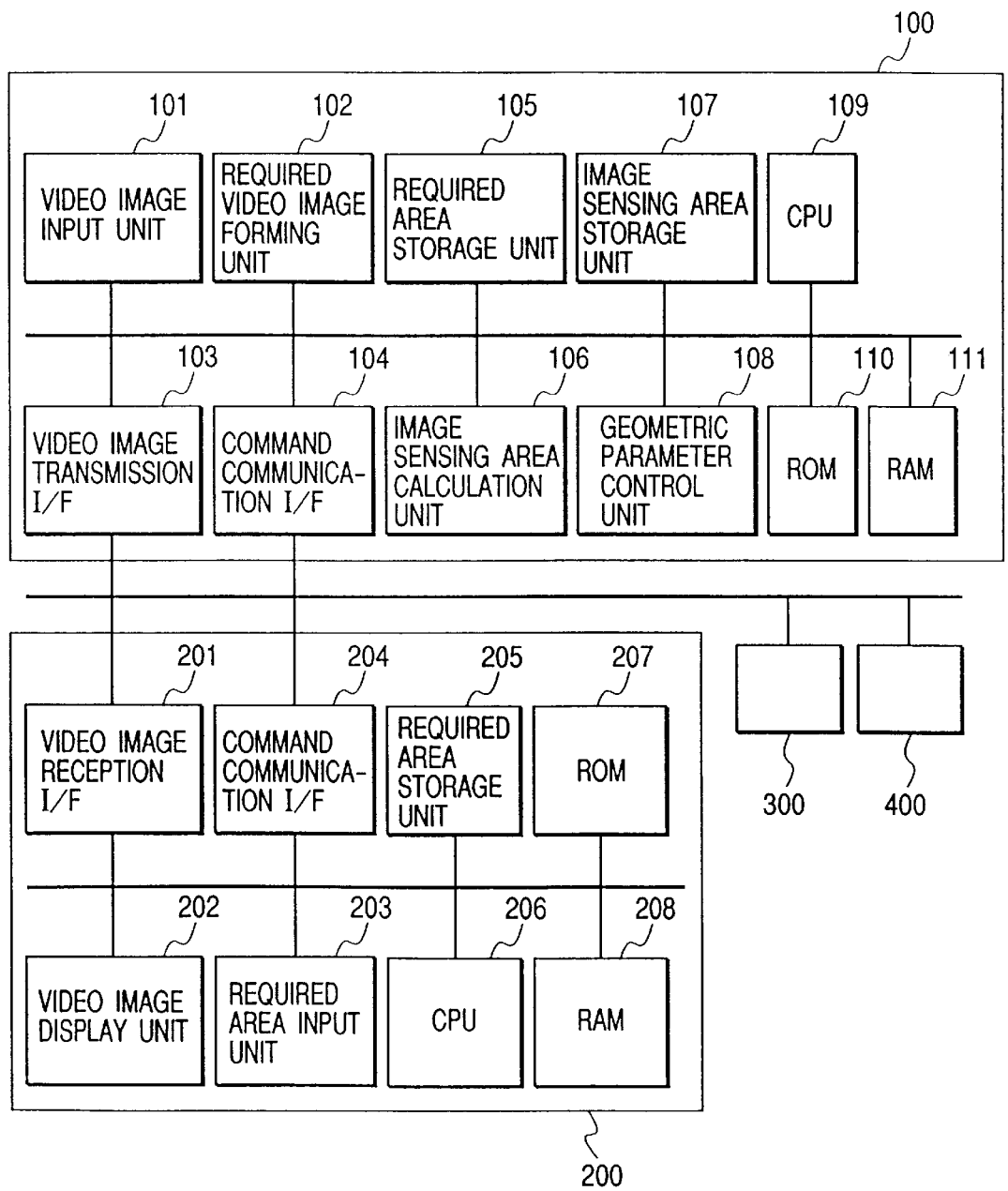
FIG. 1 is a block diagram showing the detailed arrangement of an image distributing system according to an embodiment of the present invention.

FIG. 1 is a block diagram showing the more detailed arrangement of the camera control system according to this embodiment.

Referring to FIG. 1, a camera server 100 (corresponding to the camera server 1301 in FIG. 13) is mainly comprised of blocks 101 to 108. Each of clients 200, 300, and 400 (respectively corresponding to the clients 1302, 1303, and 1304 in FIG. 13) is mainly comprised of blocks 201 to 205.

In the arrangement of the camera server 100, the video image input unit 101 is used to input a video image in the above image sensing area and made up of a zooming lens for magnifying operation, focusing lens for focusing, an iris for adjusting the amount of light, CCD for converting an optical image incident through these elements into an electrical signal, and the like. The video image input unit 101 also has the function of changing the image sensing direction of the camera.

The required video image forming unit 102 forms the above required video image by extracting video image data corresponding to the above required area from the video image in the image sensing area which is input from the video image input unit 101.

The video image transmission I/F 103 performs predetermined processing, e.g., compression, for the required video image formed by the required video image forming unit 102, and transmits the resultant data to each of the clients 200, 300, 400, . . . .

The command communication I/F 104 transmits/receives commands between the camera server 100 and the clients 200, 300, 400, . . . . The commands in this embodiment include a required area addition command which each of the clients 200, 300, 400, . . . sends to the camera server 100 when connected to the camera server 100, a required area change command which a given client sends to the camera server 100 when the client changes the position or size of a required area, a required area deletion command which each of the clients 200, 300, 400, . . . sends to the camera server 100 when disconnected from the camera server 100, and an Ack command which the camera server 100 sends to each of the clients 200, 300, 400, . . . to notify it of success/failure in the execution of each of the above commands.

The required area storage unit 105 is a storage means for storing data about a required area from each user. In this embodiment, the required area storage unit 105 stores the data about each required area, for example, in the form shown in FIG. 16. Referring to FIG. 16, a required area ID is a unique identifier substituted to each required area. Assume that the position and size of each required area are expressed by the horizontal axis coordinates of the left-end and right-end of the required area and the vertical axis coordinates of the upper-end and lower-end of the required area within an image-sensible range.

The image sensing area calculation unit 106 calculates an image sensing area on the basis of the data about each required area stored in the required area storage unit 105. For the sake of simplicity, in this embodiment, only a pan angle, tilt angle, and zoom magnification will be considered as geometric parameters for the camera. As other geometric parameters, the roll angle, position, and the like of the camera may be considered.

The image sensing area storage unit 107 stores the data about each image sensing area calculated by the image sensing area calculation unit 106.

The geometric parameter control unit 108 controls the geometric parameters for the camera to make the video image input unit 101 pick up an object in each image sensing area stored in the image sensing area storage unit 107. In this embodiment, the geometric parameter control unit 108 is made up of a pan head for the camera, motors for driving the pan head, zooming lens, motors for driving the lens, and the like.

A CPU 109 controls the overall camera server 100. The CPU 109 loads a program stored in a ROM 110 into a RAM 111 and executes processing on the basis of the loaded program.

The arrangement of the client 200 will be described next. Since the clients 300, 400, . . . have the same arrangement as that of the client 200, a description thereof will be omitted.

The video image reception I/F 201 receives the video image data sent from the video image transmission I/F 103 of the camera server 100 and reconstructs the required video image. As processing for reconstructing a required video image, decompression of the compressed data or enlargement of the video image by pixel interpolation is available.

The video image display unit 202 is a CRT or LCD and displays the required video image received and reconstructed by the video image reception I/F 201. The video image display unit 202 also displays the GUI window shown in FIG. 14 and the like.

The required area input unit 203 serves to input instructions for the position, size, and the like of a required area. In this embodiment, the required area input unit 203 is comprised of a keyboard and a pointing device such as a mouse.

The command communication I/F 204 transmits/receives commands between the camera server 100 and the client 200. The types of commands have already been described above.

The required area storage unit 205 stores data about a required area from the client user.

A CPU 206 controls the overall client 200. The CPU 206 loads a program stored in a ROM 207 into a RAM 208, and executes processing on the basis of the loaded program.

The operation of the camera control system according to this embodiment will be described next.

Figure 2:
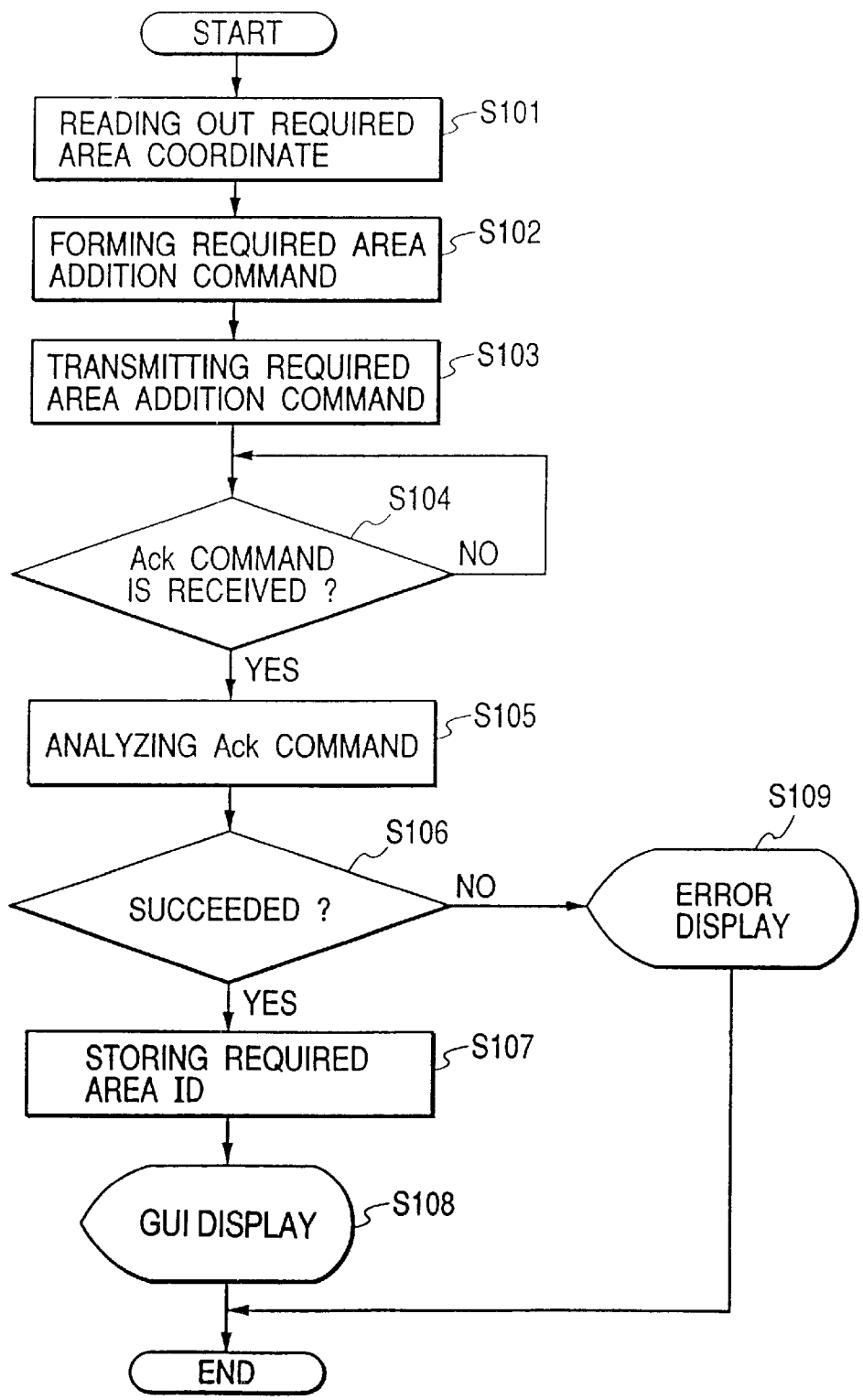
FIG. 2 is a flow chart showing control in this embodiment, and more specifically, the operation of a client in a start-up period.

FIG. 2 is a flow chart showing the operation of the client 200 in a start-up period. When the client 200 starts, the CPU 206 reads out a required area coordinate value (the value stored when the client 200 started previously or the default value) from the required area storage unit 205 in step S101. In step S102, the CPU 206 forms a required area addition command for adding the required area to the camera server 100. This required area addition command includes the readout required area coordinate value.

The flow advances to step S103 to make the command communication I/F 204 transmit the formed required area addition command to the camera server 100. The flow then advances to step S104 to check whether the command communication I/F 204 has received an Ack command corresponding to the required area addition command. If NO in step S104, the processing in step S104 is repeated.

If the Ack command is received from the camera server 100, the flow advances to step S105 to analyze the received Ack command. In step S106, the CPU 206 checks success/failure in the execution of the required area addition command on the basis of the Ack command analysis result.

If success is determined, the flow advances to step S107 to store the required area ID written in the received Ack command in the required area storage unit 205. The flow then advances to step S108 to rewrite the GUI data or the like. The start-up processing of the client is terminated. If it is determined in step S106 that the execution of the required area addition command has failed, the flow advances to step S109 to display the contents of the error. Thereafter, the processing is terminated.

Figure 3:
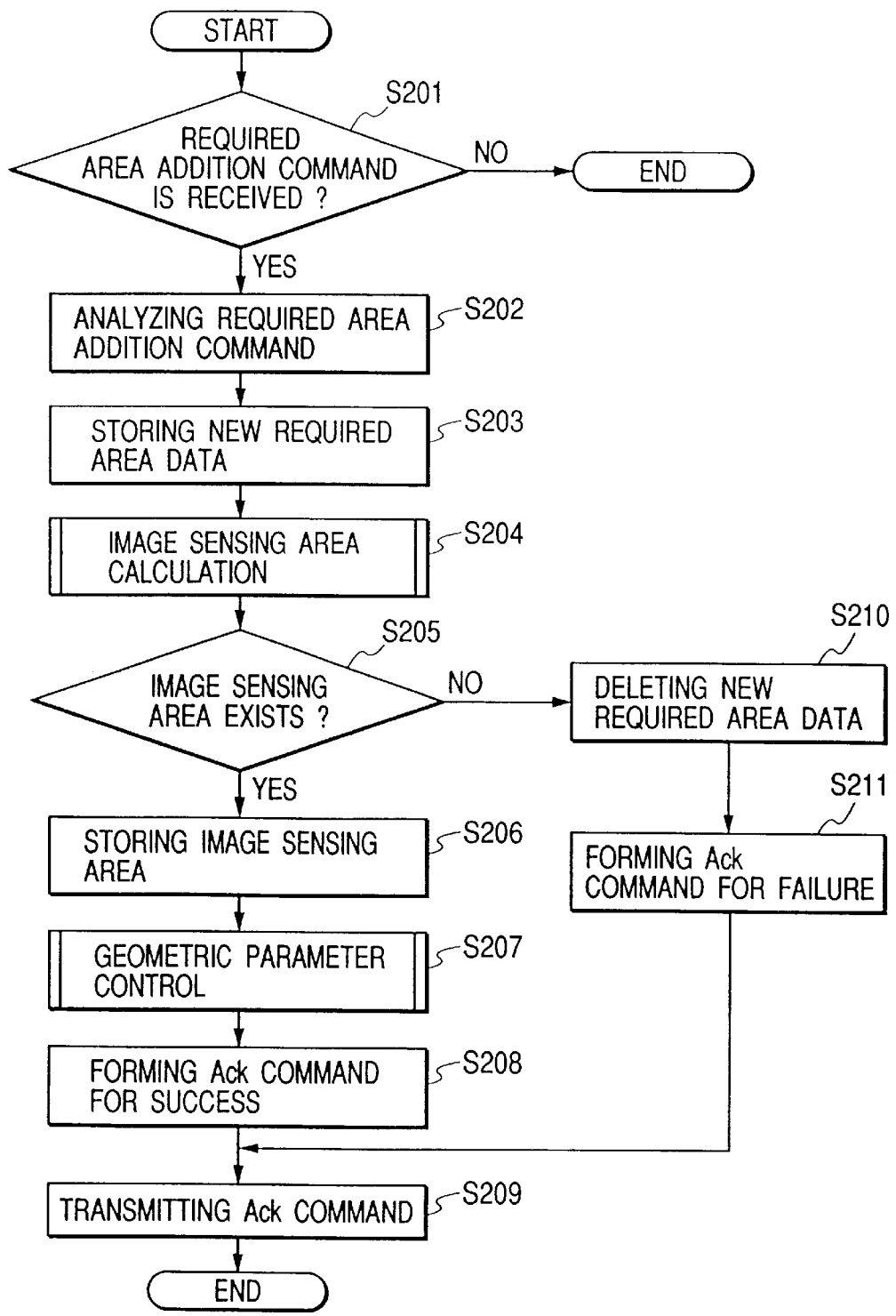
FIG. 3 is a flow chart showing control in this embodiment, and more specifically, the operation of a camera server upon reception of a required area addition command.

FIG. 3 is a flow chart showing the operation of the camera server 100 in a case wherein the camera server 100 receives the above required area addition command from the client 200. If it is determined in step S201 that the command communication I/F 104 has received the required area addition command, the flow advances to step S202 to analyze the received command.

The flow then advances to step S203 to store data about the new required area in the required area storage unit 105 on the basis of the analysis result. More specifically, the camera server 100 forms a field associated with the new required area in the required area storage unit 105, generates a unique required area ID, and stores it in the field, together with the coordinate data. The flow advances to step S204 to make the image sensing area calculation unit 106 calculate an image sensing area including all the required areas stored in the required area storage unit 105. This processing will be described later with reference to FIGS. 4 and 5.

In step S205, it is checked on the basis of the result in step S204 whether the calculation of an image sensing area is successful. If YES in step S205, the flow advances to step S206 to store the data of the image sensing area as the calculation result in the image sensing area storage unit 107. The flow advances to step S207 to make the geometric parameter control unit 108 control geometric parameters for the camera so as to perform image sensing operation in the image sensing area stored in the image sensing area storage unit 107. This control method will be described later with reference to FIG. 6.

The flow advances to step S208 to form an Ack command for notifying the client that has generated the required area addition requirement of the addition of the required area. In this case, the Ack command includes the required area ID attached to the required area. The flow then advances to step S209 to transmit the formed Ack command to the client.

If it is determined in step S205 that the calculation of an image sensing area has failed, the flow advances to step S210 to delete the required area field added in step S203 from the required area storage unit 105. The flow advances to step S211 to form an Ack command for notifying the client of the failure in the addition of a required area. The flow then advances to step S209 to transmit the formed Ack command to the client.

The image sensing area calculating operation in step S204 will be described next with reference to the flow charts of FIGS. 4 and 5. In principle, in determining an image sensing area, the center of all required areas coincides with the center of the image sensing area. This is because a video image sensed by the camera shows less distortion with a decrease in distance to the center. To realize this operation, certain processing must be performed to prevent an image sensing area from overlapping the image-sensible range.

Figure 4:
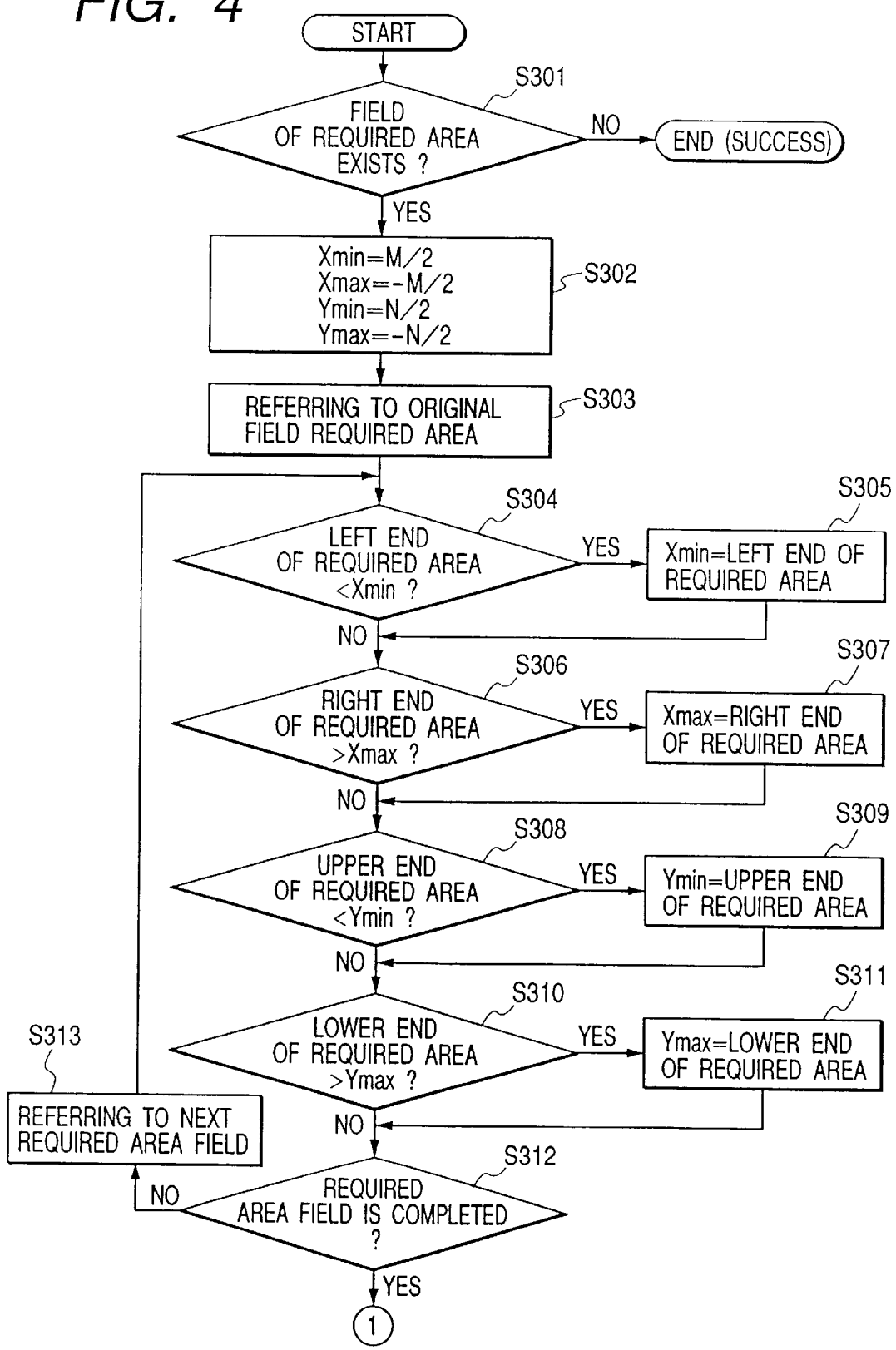
FIG. 4 is a flow chart showing control in this embodiment, and more specifically, image sensing area calculating operation.

Referring to FIG. 4, it is checked in step S301 whether a required area field exists in the required area storage unit 105. If YES in step S301, the flow advances to step S302 to substitute M/2, −M/2, N/2, and −N/2 as initial settings in variables Xmin, Xmax, Ymin, and Ymax, respectively. In this case, (−M/2, −N/2) and (M/2, N/2) respectively represent the coordinates of the upper left point and lower right point of the image-sensible range.

The flow advances to step S303 to refer to the contents of the first field stored in the required area storage unit 105. In step S304, the horizontal axis coordinate of the left end of the currently referred required area is checked and compared with the variable Xmin. If the variable Xmin is larger than the this coordinate, the horizontal axis coordinate of the left end of the currently referred required area is substituted in the variable Xmin in step S305.

In step S306, the horizontal axis coordinate of the right end of the currently referred required area is compared with the variable Xmax. If the variable Xmax is smaller than this coordinate, the horizontal axis coordinate of the right end of the currently referred required area is substituted in the variable Xmax in step S307. In step 308, the vertical axis coordinate of the upper end of the currently referred required area is compared with the variable Ymin. If the variable Ymin is larger than this coordinate, the vertical axis coordinate of the upper end of the currently referred required area is substituted in the variable Ymin in step S307.

In step S310, the vertical axis coordinate of the lower end of the currently referred required area is compared with the variable Ymax. If the variable Ymax is smaller than this coordinate, the vertical axis coordinate of the lower end of the currently referred required area is substituted in the variable Ymax in step S311. In step S312, it is checked whether all the fields in the required area storage unit 105 are checked. If NO in step S312, the flow advances to step S313 to refer to the next required area field. The flow then returns to step S304.

Figure 5:
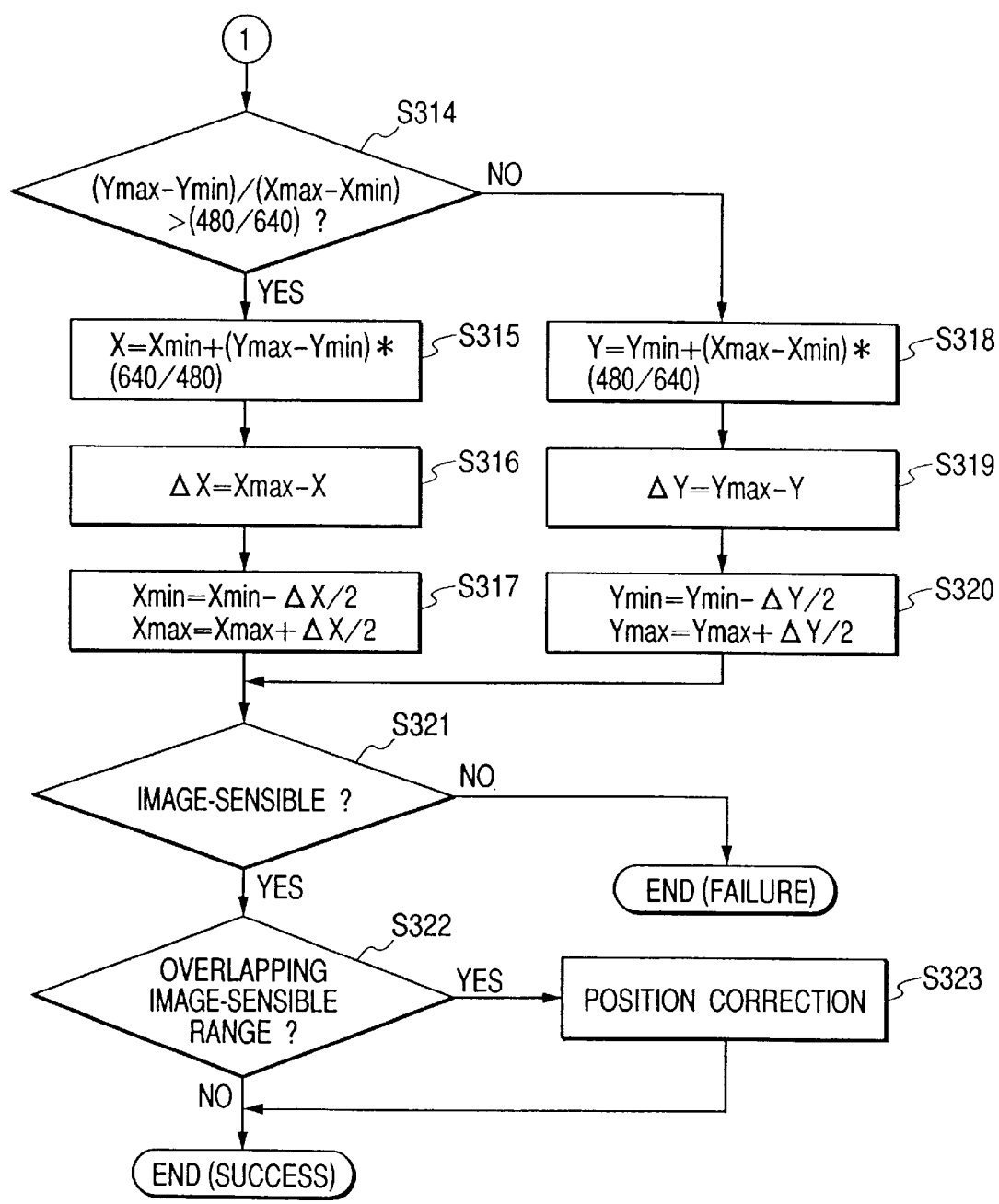
FIG. 5 is a flow chart showing control in this embodiment, and more specifically, image sensing area calculating operation.

If YES in step S312, the flow advances to step S314 in FIG. 5. At this time, the horizontal axis coordinate of the left end of the leftmost area of all the required areas is stored as the variable Xmin; the horizontal axis coordinate of the right end of the rightmost area, as the variable Xmax; the vertical axis coordinate of the upper end of the uppermost area, as the variable Ymin; and the vertical axis coordinate of the lower end of the lowermost area, as the variable Ymax.

In step S314, the value of (Ymax−Ymin)/(Xmax−Xmin) is calculated, and the calculation result is compared with (480/640). If the former value is larger, it indicates that the rectangular area determined by the respective variables Xmin, Xmax, Ymin, and Ymax is vertically long as compared with the shape of the image-sensible range. This vertically long area must therefore be corrected to a figure similar to the image-sensible range.

In this case, the flow advances to step S315 to substitute the calculation result of Xmin+(Ymax−Ymin)×(640/480) in a variable X. The flow then advances to step S316 to substitute the calculation result of Xmax−X in a variable ΔX. The flow advances to step S317 to decrease the value of the variable Xmin by ΔX/2 and increase the value of the variable Xmax by ΔX/2. An image sensing area similar to the image-sensible range is generated by increasing the rectangular area determined by the variables Xmin, Xmax, Ymin, and Ymax in units of Δ/2 in the horizontal direction in this manner.

If it is determined in step S314 that the latter value is larger, it indicates that the rectangular area determined by the variables Xmin, Xmax, Ymin, and Ymax is horizontally long as compared with the shape of the image-sensible range. This horizontally long area must therefore be corrected to a figure similar to the image-sensible range. In this case, the flow advances to step S318 to substitute the calculation result of Ymin+(Xmax−Xmin)×(480/640) in a variable Y.

The flow advances to step S319 to substitute the calculation result of Ymax−Y in a variable ΔY. The flow advances to step S320 to decrease the value of the variable Ymin by ΔY/2 and increase the value of the variable Ymax by ΔY/2. An image sensing area similar to the image-sensible range is generated by increasing the rectangular area determined by the variables Xmin, Xmax, Ymin, and Ymax in units of ΔY/2 in the vertical. direction in this manner.

As shown in FIG. 15B, an image sensing area may be formed by increasing the size in only one direction by ΔX or ΔY.

When an image sensing area similar to the image-sensible range is formed in the above-described manner, the flow advances to step S321 in either of the above cases. In step S321, the value of Xmax−Xmin or Ymax−Ymin is compared with the maximum size of the area which is recorded in advance and can be sensed by the camera to determine whether the formed image sensing area can be sensed by the camera. If it is determined that this area cannot be sensed, it is determined that the calculation of the image sensing area has failed. The processing is then terminated.

If it is determined that this area can be sensed, the flow advances to step S322 to check whether the formed image sensing area overlap the image-sensible range. If YES in step S322, the flow advances to step S323 to correct the position of the image sensing area to include the image sensing area in the image-sensible range.

For example, whether an image sensing area overlaps the image-sensible range downward can be determined by comparing the value of the variable Ymax with the value of N/2. In addition, the image sensing area can be corrected by obtaining the difference between the value of the variable Ymax and the value of N/2 and subtracting the difference from the variables Ymin and Ymax. Whether the image sensing area overlaps the image-sensible range upward, rightward, or leftward can be determined in the same manner, and correction in each case can also be performed in the same manner.

With the above processing, the coordinates (Xmin, Ymin) of the upper left point and coordinates (Xmax, Ymax) of the lower right point of the image sensing area can be obtained. In this case, it is determined that the calculation of an image sensing area is successful, and the processing is terminated.

The operation in step S207 to be performed to control geometric parameters for the camera to pickup an object in the image sensing area stored in the image sensing area storage unit 107 will be described next with reference to the flow chart of FIG. 6. Prior to the execution of this processing, in step S206, the horizontal axis coordinate Xmin corresponding to the left end of the image sensing area, the horizontal axis coordinate Xmax corresponding to the right end, the vertical axis coordinate Ymin corresponding to the upper end, and the vertical axis coordinate Ymax corresponding to the lower end are stored in the image sensing area storage unit 107.

Figure 6:
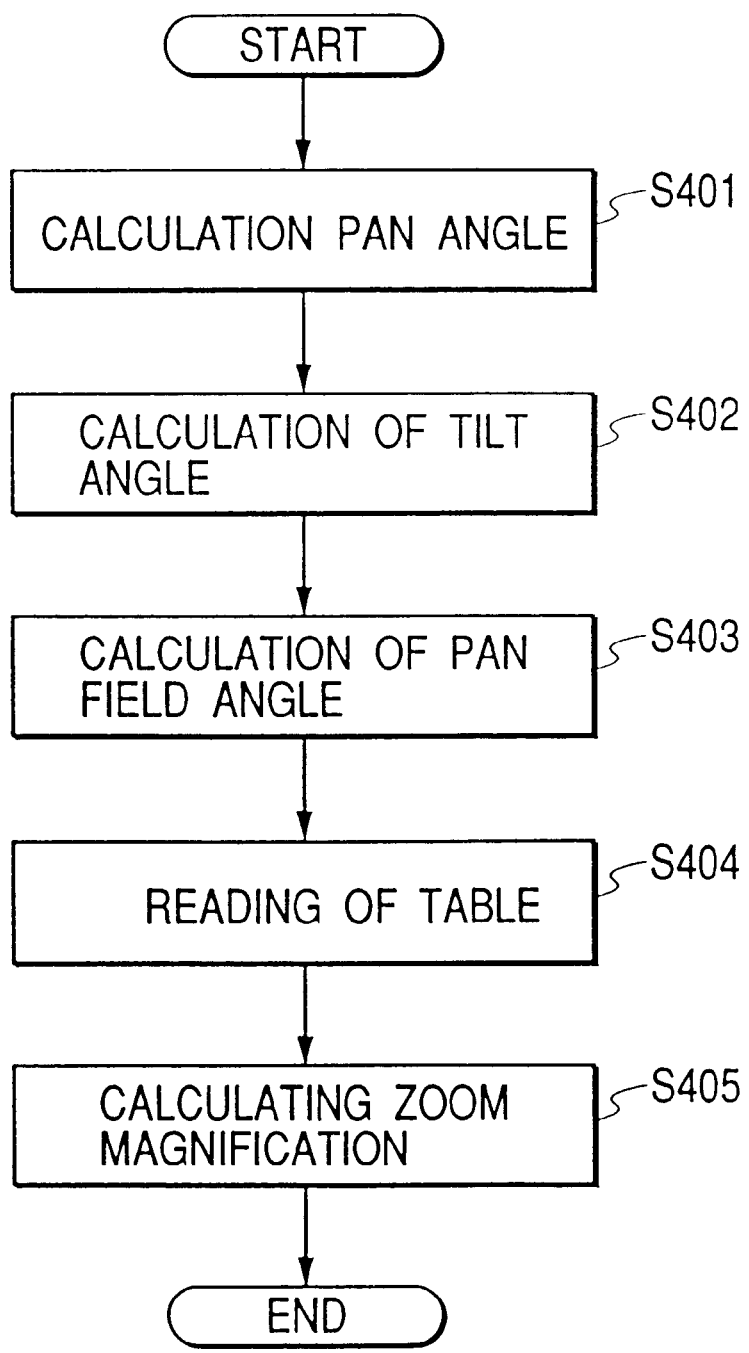
FIG. 6 is a flow chart showing control in this embodiment, and more specifically, operation for geometric parameter control on the camera.
Figures 17, 18:
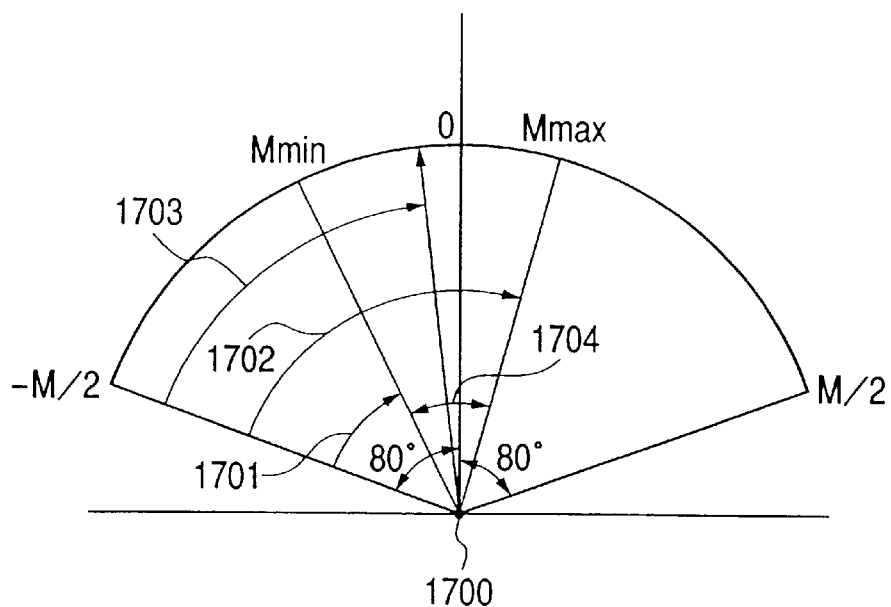
FIG. 17 is a view for explaining the relationship between the horizontal axis coordinates of an image sensing area and the pan angle of the camera.
FIG. 18 is a view showing an example of a table showing the correspondence between pan angles and zoom magnifications.

Referring to FIG. 6, in step S401, the pan angle of the camera is calculated. Assume that in this embodiment, the camera is movable at pan angles up to ±80° and tilt angles up to ±60°. FIG. 17 shows the relationship between the horizontal axis coordinate of the image sensing area and the pan angle of the camera in this case.

Referring to FIG. 17, the camera has a viewpoint 1700. The pan angle corresponding to the left end of the image sensing area is Xmin×160/M (1701 in FIG. 17), and the pan angle corresponding to the right end is Xmax×160/M (1702 in FIG. 17). The pan angle which the camera should assume therefore coincides with the middle point between the left and right ends of the image sensing area, i.e., {Xmin+Xmax)/2×(160/M) (1703 in FIG. 17). When a pan angle 1703 is set, a view angle 1704 is set.

In step S402, the tilt angle of the camera is calculated in the same manner. The tilt angle of the upper end of the image sensing area can be expressed as Ymin×120/N, and the tilt angle corresponding to the lower end can be expressed as Ymax×120/N. The tilt angle which the camera should assume therefore is expressed as {(Ymin+Ymax)/2}×(120/N). Finally, the zoom magnification of the camera is calculated. The zoom magnification can be obtained from the pan angle (1704 in FIG. 17) of the camera.

More specifically, in step S403, the pan angle of the camera is calculated. In this case, as is obvious from FIG. 17, the view angle is (Xmax−Xmin)×(160/M). The flow then advances to step S404 to load a table (table information) in which the correspondence between the pan angles and the zoom magnifications is written from the ROM 110 into the RAM 111. FIG. 18 shows an example of this table. The flow advances to step S405 to obtain a zoom magnification corresponding to the view angle obtained in step S403.

Figure 7:
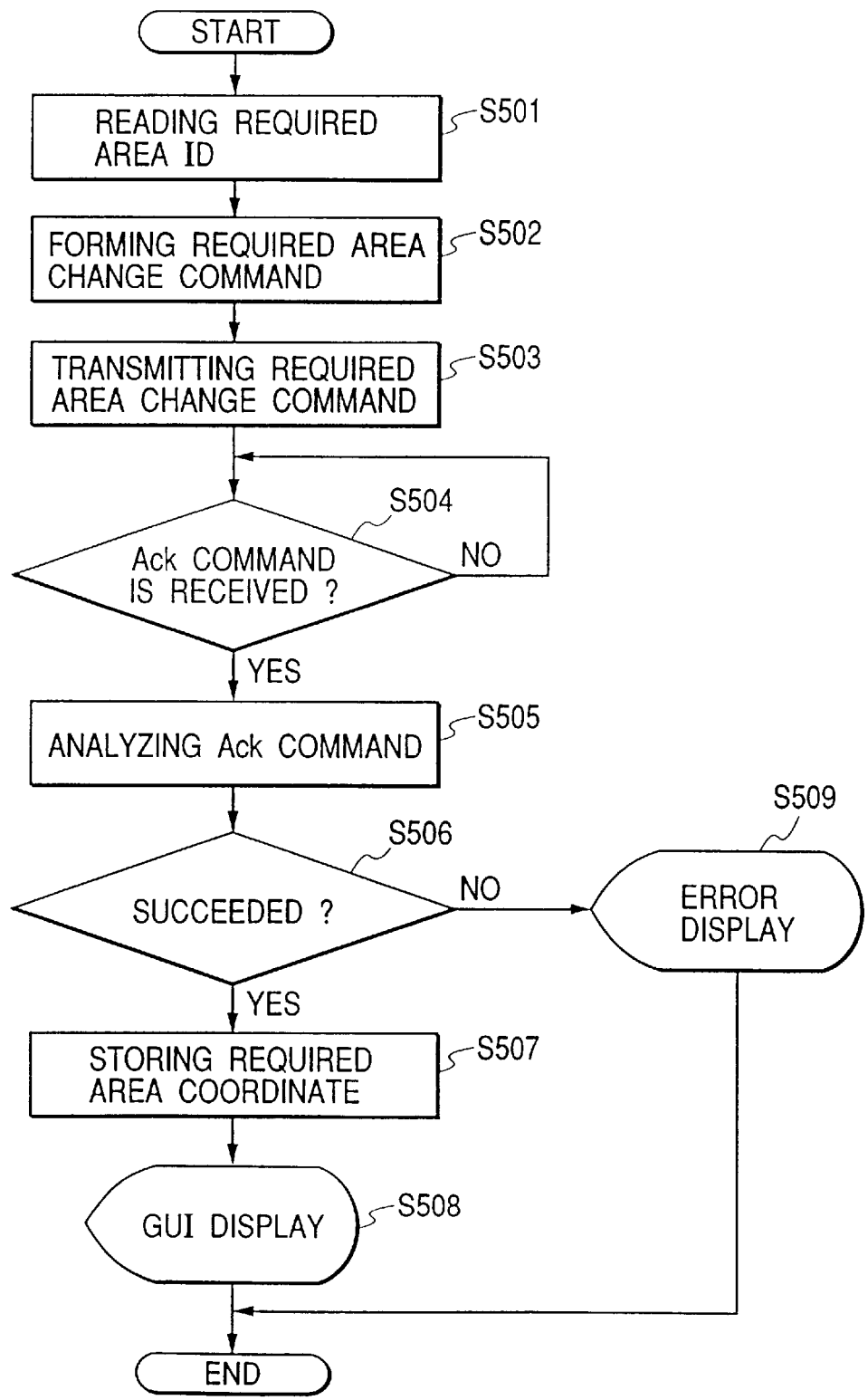
FIG. 7 is a flow chart showing control in this embodiment, and more specifically, operation in a case wherein a client inputs a required area change command.

FIG. 7 is a flow chart showing the operation of the client 200 in a case wherein an instruction to change the size, position, or the like of a required area is input through the required area input unit 203 of the client 200. Referring to FIG. 7, when an instruction to change a required area is input, the corresponding required area ID is read out from the required area storage unit 205 in step S501. In step S502, a required area change command for changing the coordinates of the required area is formed. This required area change command includes the required area ID read out in step S501 and the coordinates of the required area after the change.

The flow then advances to step S503 to make the command communication I/F 204 transmit the formed required area change command to the camera server 100. The flow advances to step S504 to check whether the command communication I/F 204 has received an Ack command corresponding to the transmitted required area change command. If NO in step S504, the processing in step S504 is repeated. If YES in step S504, the flow advances to step S505 to analyze the Ack command.

In step S506, it is checked from the contents of the analyzed Ack command whether the execution of the required area change command is successful. If YES in step S506, the flow advances to step S507 to store the new required area coordinates in the required area storage unit 205. The flow then advances to step S508 to perform processing, e.g., rewriting the GUI data. Thereafter, the required area changing operation is terminated. If NO in step S506, the flow advances to step S509 to display the contents of the error.

Figure 8:
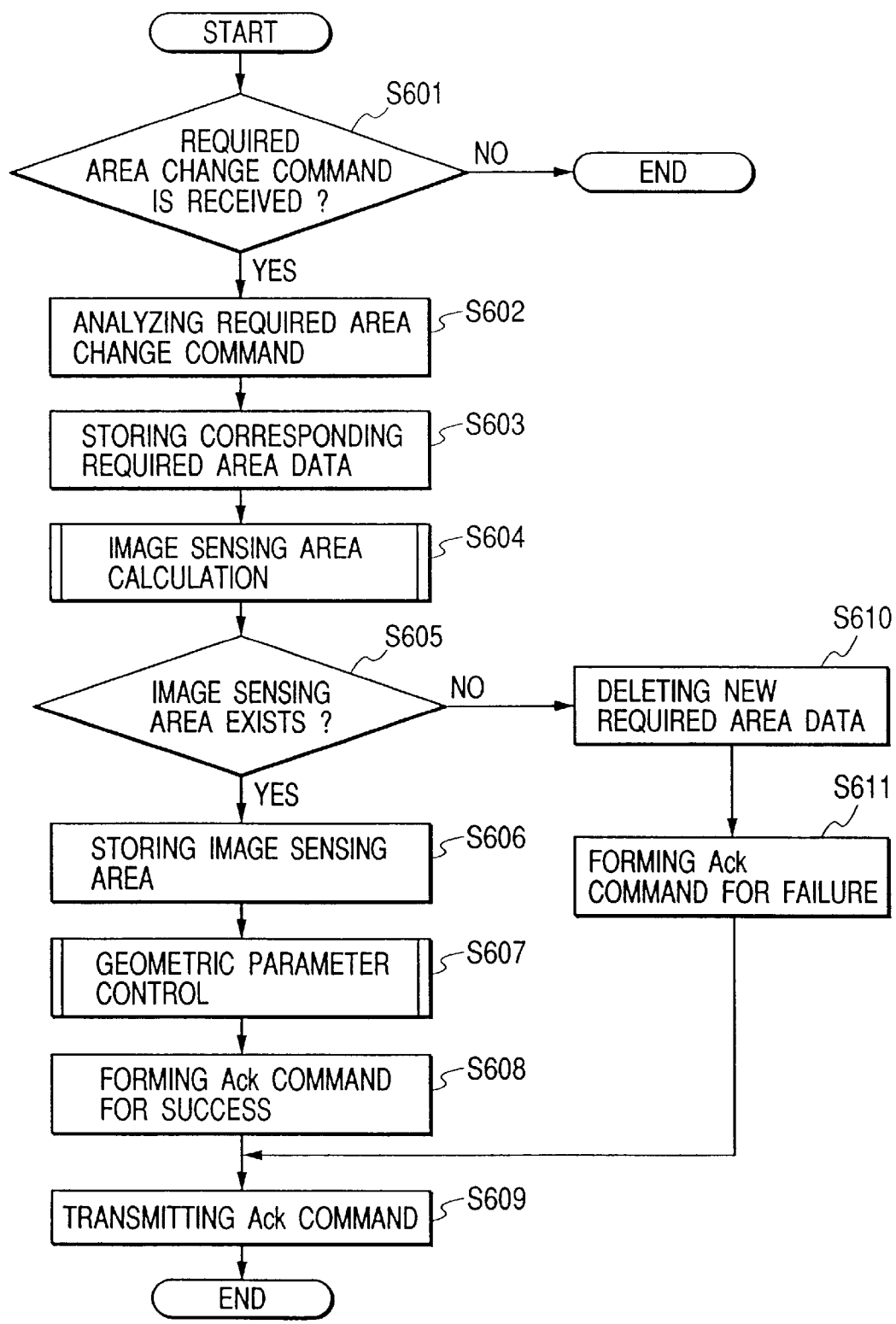
FIG. 8 is a flow chart showing control in this embodiment, and more specifically, operation in a case wherein the camera server receives a required area change command.

FIG. 8 is a flow chart showing the operation of the camera server 100 in a case wherein the camera server 100 receives the above required area change command from the client 200. Referring to FIG. 8, if it is determined in step S601 that the camera server 100 has received the required area change command through the command communication I/F 104, the flow advances to step S602 to analyze the received command and check the required area ID and the coordinates after the change.

The flow then advances to step S603 to search the required area storage unit 105 for a required area field corresponding to the required area ID checked in step S602 and update the coordinate data. The flow advances to step S604 to make the image sensing area calculation unit 106 calculate an image sensing area including all the required areas in the required area storage unit 105. This processing is the same as that in step S204 in FIG. 3, i.e., the processing shown in FIGS. 4 and 5, and hence a description thereof will be omitted.

The flow advances to step S605 to check from the result in step S604 whether the calculation of an image sensing area is successful. If YES in step S605, the flow advances to step S606 to store the data of the image sensing area as the calculation result in the image sensing area storage unit 107. The flow advances to step S607 to make the geometric parameter control unit 108 control the geometric parameters for the camera to pickup an object in the image sensing area stored in the image sensing area storage unit 107. This processing is the same as that in step S207 in FIG. 3, i.e., the processing shown in FIG. 6, and hence a description thereof will be omitted.

The flow further advances to step S608 to form an Ack command for notifying the client that has required the required area change of the success in changing the required area. The flow advances to step S609 to transmit the formed Ack command to the client.

If it is determined in step S605 that the calculation of an image sensing area has failed, the flow advances to step S610 to delete the required area field previously updated in step S603 from the required area storage unit 105. In this case, when the field is updated in step S603, the field before the update may be saved to be restored to the original field. The flow then advances to step S611 to form an Ack command for notifying the client of the failure in updating the required area. The flow advances to step S609 to transmit the formed Ack command to the client.

Figure 9:
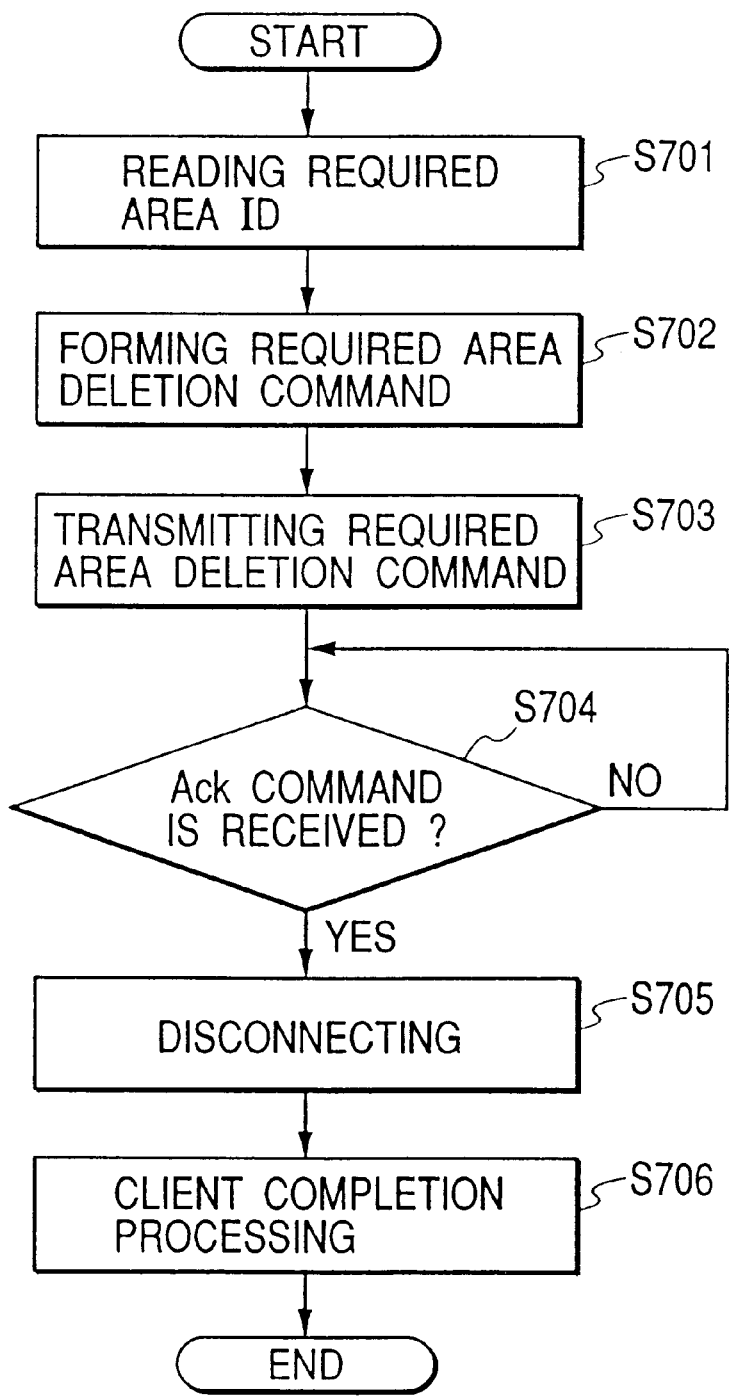
FIG. 9 is a flow chart showing control in this embodiment, and more specifically, operation for client completion processing.

FIG. 9 is a flow chart showing the operation of the client 200 in a case wherein the camera server 100 is disconnected from the client 200. Referring to FIG. 9, in step S701, a required area ID is read out from the required area storage unit 205. The flow then advances to step S702 to form a required area deletion command for deleting the required area required by the client 200 from the camera server 100. This required area deletion command includes the required area ID read out in step S701.

The flow advances to step S703 to make the command communication I/F 204 transmit the formed required area deletion command to the camera server 100. The flow advances to step S704 to check whether the command communication I/F 204 has received an Ack command corresponding to the transmitted required area deletion command. If NO in step S704, the processing in step S704 is repeated. If YES in step S704, the camera server 100 is disconnected from the client 200. In step S706, client 200 completion processing is performed.

Figure 10:
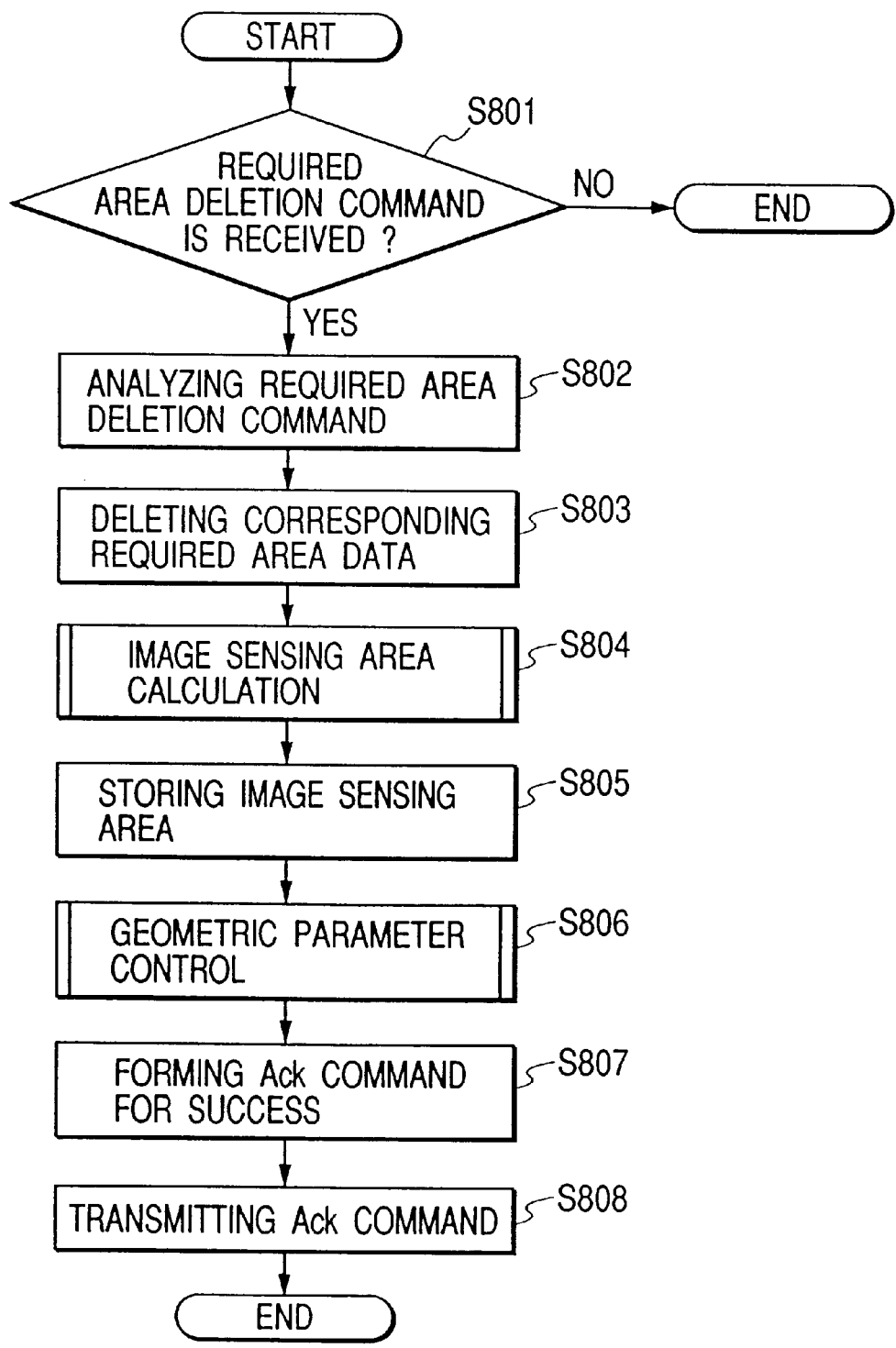
FIG. 10 is a flow chart showing control in this embodiment, and more specifically, operation in a case wherein the camera server receives a required area deletion command.

FIG. 10 is a flow chart showing the operation of the camera server 100 in a case wherein the camera server 100 receives the above required area deletion command from the client 200. Referring to FIG. 10, if it is determined in step S801 that the camera server 100 has received the required area deletion command through the command communication I/F 104, the received command is analyzed and the required area ID is checked in step S802.

The flow then advances to step S803 to delete a required area field corresponding to the required area ID checked in step S802 from the required area storage unit 105. The flow advances to step S804 to make the image sensing area calculation unit 106 calculate an image sensing area including all the required areas in the updated required area storage unit 105. This processing is the same as that in step S204 in FIG. 3, i.e., the processing in FIGS. 4 and 5, and hence a description thereof will be omitted.

After this processing, the flow advances to step S805 to store the data of the image sensing area as the calculation result obtained in step S804 in the image sensing area storage unit 107. The flow advances to step S806 to make the geometric parameter control unit 108 control geometric parameters for the camera to photograph an object in the image sensing area stored in the image sensing area storage unit 107. This processing is the same as that in step S207 in FIG. 3, i.e., the processing in FIG. 6, and hence a description thereof will be omitted.

The flow advances to step S807 to form an Ack command for notifying the client which has required the required area deletion of the success in deleting the required area. The flow then advances to step S808 to transmit the formed Ack command to the client.

Figure 11:
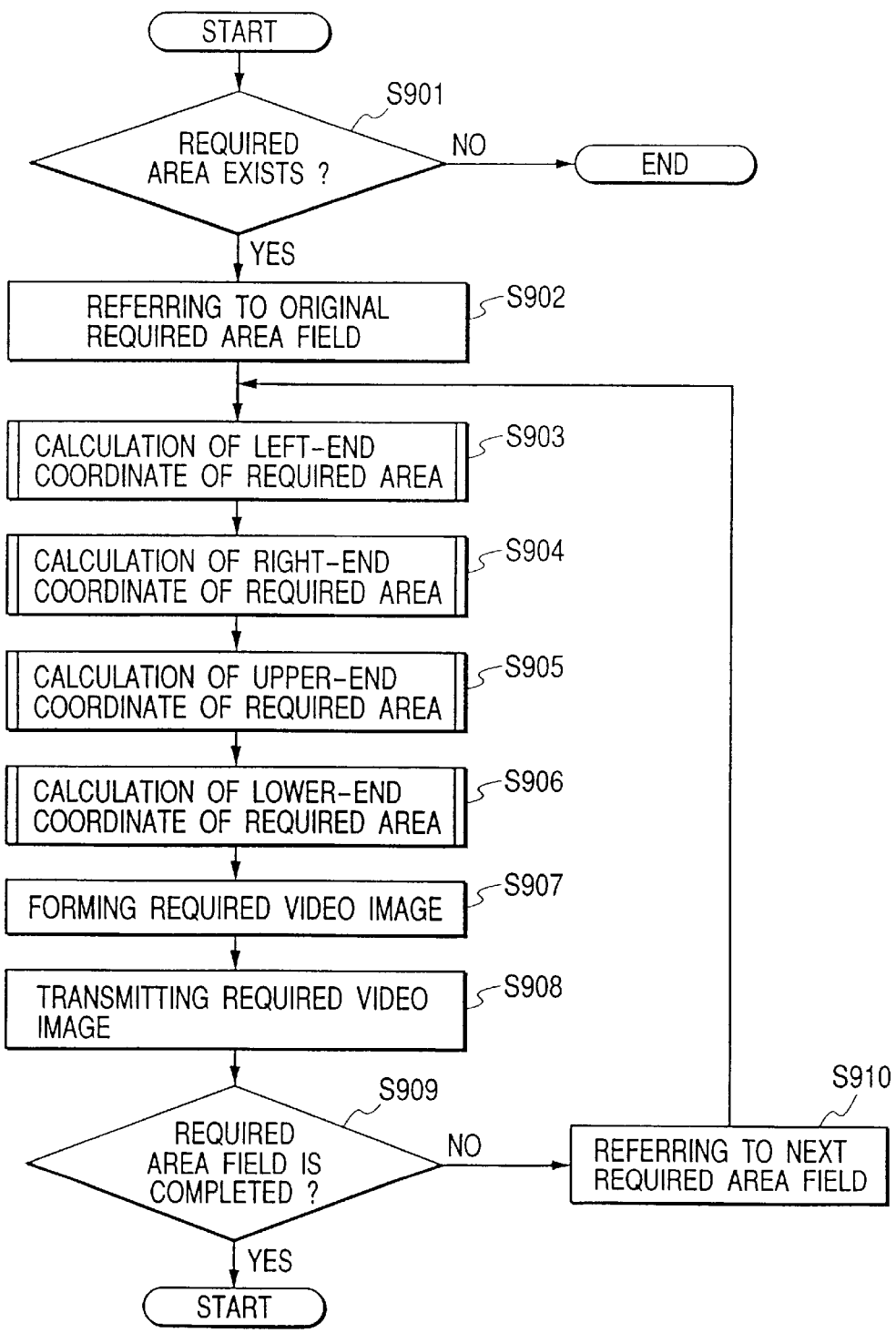
FIG. 11 is a flow chart showing control in this embodiment, and more specifically, operation in a case wherein the camera server forms a required video image.

FIG. 11 is a flow chart showing a procedure by which the required video image forming unit 102 of the camera server 100 forms a required video image corresponding to each required area. Referring to FIG. 11, in step S901, it is checked whether a required area field exists in the required area storage unit 105. If YES in step S901, the flow advances to step S902 to refer to the original required area field.

The flow then advances to step S903 to calculate the left-end coordinates of the required area in the sensed video image. In this case, the coordinates are expressed by a coordinate system whose upper left point and lower right point are respectively represented by (0, 0) and (640, 480). This calculation method will be described later with reference to FIG. 12. In step S904, the right-end coordinates of the required video image are calculated. In step S905, the upper-end coordinates of the required video image are calculated. In step S906, the lower-end coordinates of the required video image are calculated.

The flow advances to step S907 to cut the required video image from the video image in the image sensing area on the basis of the calculation results obtained in steps S903 to S906. The flow advances to step S908 to make the video image transmission I/F 103 transmit the formed required video image to the corresponding client. The flow then advances to step S909 to check whether any field to which the CPU has not referred to exists in the required area storage unit 105. If YES in step S909, the CPU refers to the next field in step 910, and the flow returns to step S903 to repeat the processing.

Figure 12:
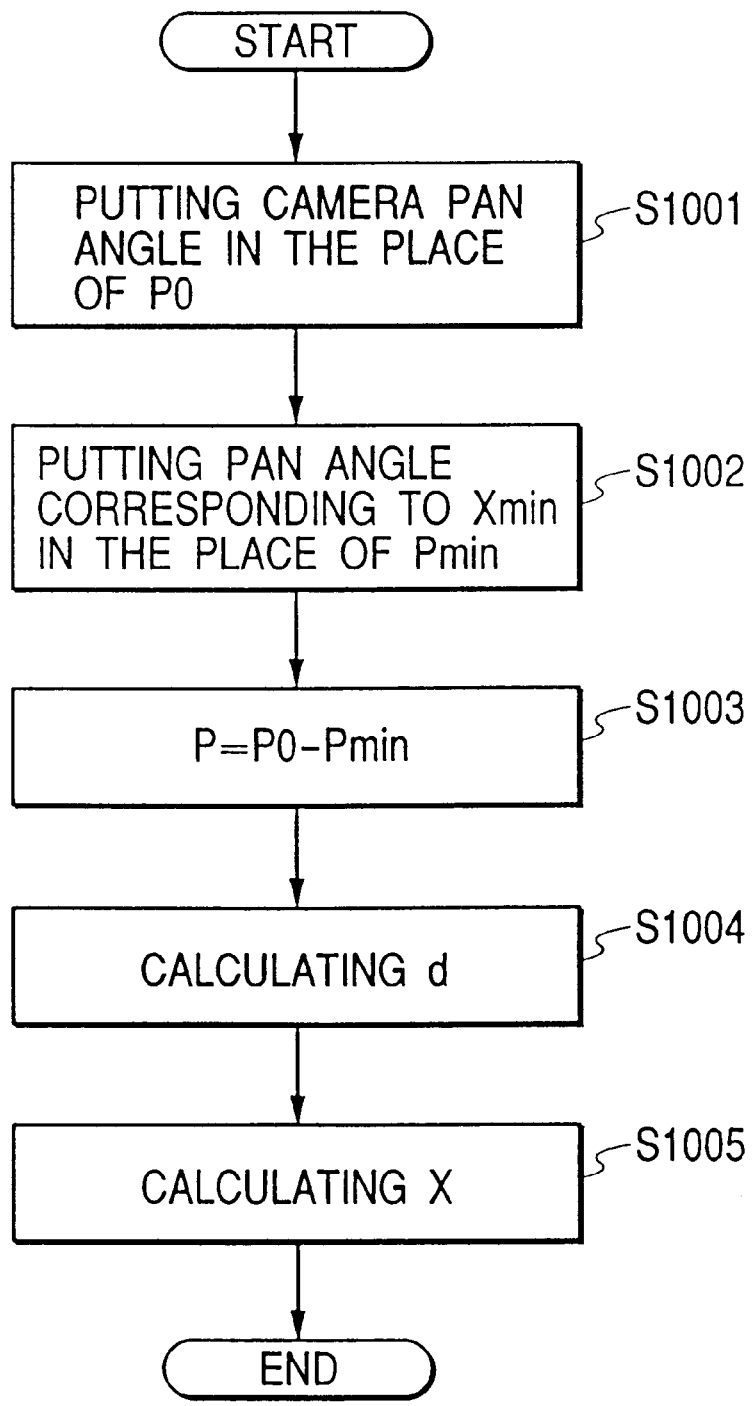
FIG. 12 is a flow chart showing control in this embodiment, and more specifically, operation to be performed to obtain the left-end coordinates of a required video image in a video image.
Figure 19:
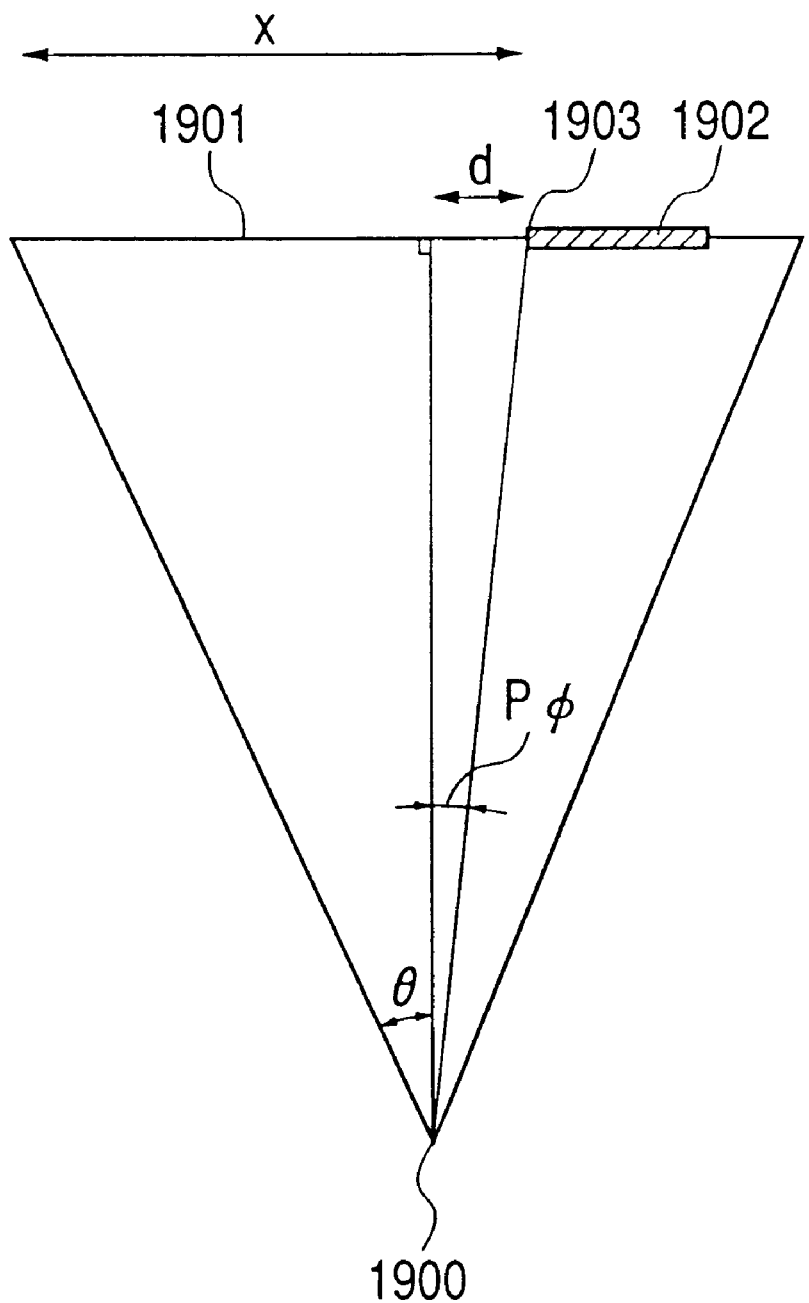
FIG. 19 is a view showing the relationship between the pan angle of the camera and the horizontal axis coordinates of the left end of a required area in a video image.

FIG. 12 is a flow chart showing a procedure for obtaining the left-end coordinates of the required vertical axis coordinate in the sensed video image in step S903 in FIG. 11. Note that the right-end, upper-end, and lower-end coordinates of the required video image can also be obtained by the same procedure. FIG. 19 shows the relationship between the pan angle of the camera and the horizontal axis coordinate of the left end of the required video image in the sensed video image. FIG. 19 shows a viewpoint 1900 of the camera, sensed video image 1901, required video image 1902, and left end 1903 of the required video image.

Referring to FIG. 12, in step S1001, the pan angle (1703 in FIG. 17) of the camera is substituted in a variable P0. In step S1002, a pan angle (1701 in FIG. 17) corresponding to the variable Xmin is substituted in a variable Pmin. The flow then advances to step S1003 to substitute the calculation result of P0−Pmin in a variable P.

The flow advances to step S1004 to obtain the number of pixels between the center of the sensed video image 1901 and the left end 1903 of the required video image, i.e., a value d in FIG. 19. The value d can be obtained by 320×tanP/tanθ (where 320 is ½ the number of pixels of the sensed video image in the horizontal direction, and 0 is the pan angle). The flow advances to step S1005 to obtain a coordinate X of the left end of the required video image in the sensed video image. This coordinate X is obtained by d+320.

As described in detail above, according to this embodiment, only the minimum area (image sensing area) including all the required areas required by the respective users is sensed, and the respective required areas are extracted from the sensed video image and distributed to the respective users unlike the prior art, in which a video image is sensed by the camera at the maximum view angle, and the video images of the areas required by the respective users are cut from the entire video image and distributed to the users.

This allows the respective users to simultaneously control geometric parameters for one camera, and can also suppress the electronic zoom magnification of each required video image to be distributed to a low magnification, as compared with a case wherein the camera senses an image at the maximum view angle, thereby minimizing a deterioration in the image quality of each required video image.

In the above embodiment, the camera senses a rectangular image, and the image-sensible range is also rectangular. However, the present invention is not limited to this. For example, the limits of the image-sensible range may be eliminated by using a camera capable of performing image sensing operation in all directions. In this case, the coordinates of a required area and image sensing area are expressed by polar coordinates or the like.

In the above embodiment, when a new required area addition requirement or required area change requirement is sent from the client side, it is checked on the server side whether the requirement can be satisfied. If the requirement can be satisfied, the image sensing area is updated in consideration of the new required area. If the requirement cannot be satisfied, a failure is determined.

In contrast to this, in the second embodiment, a method of calculating an image sensing area satisfying the maximum number of requirements of all requirements every time a required area addition or change requirement is generated will be described. With this method, a system that can always satisfy the maximum number of requirements is realized.

Note that a method of designating required areas in clients 200, 300, 400, . . . , a method of adding, deleting, and changing required areas in a camera server 100, and a camera control method are the same as those in the first embodiment, and hence a description thereof will be omitted.

Figure 20:
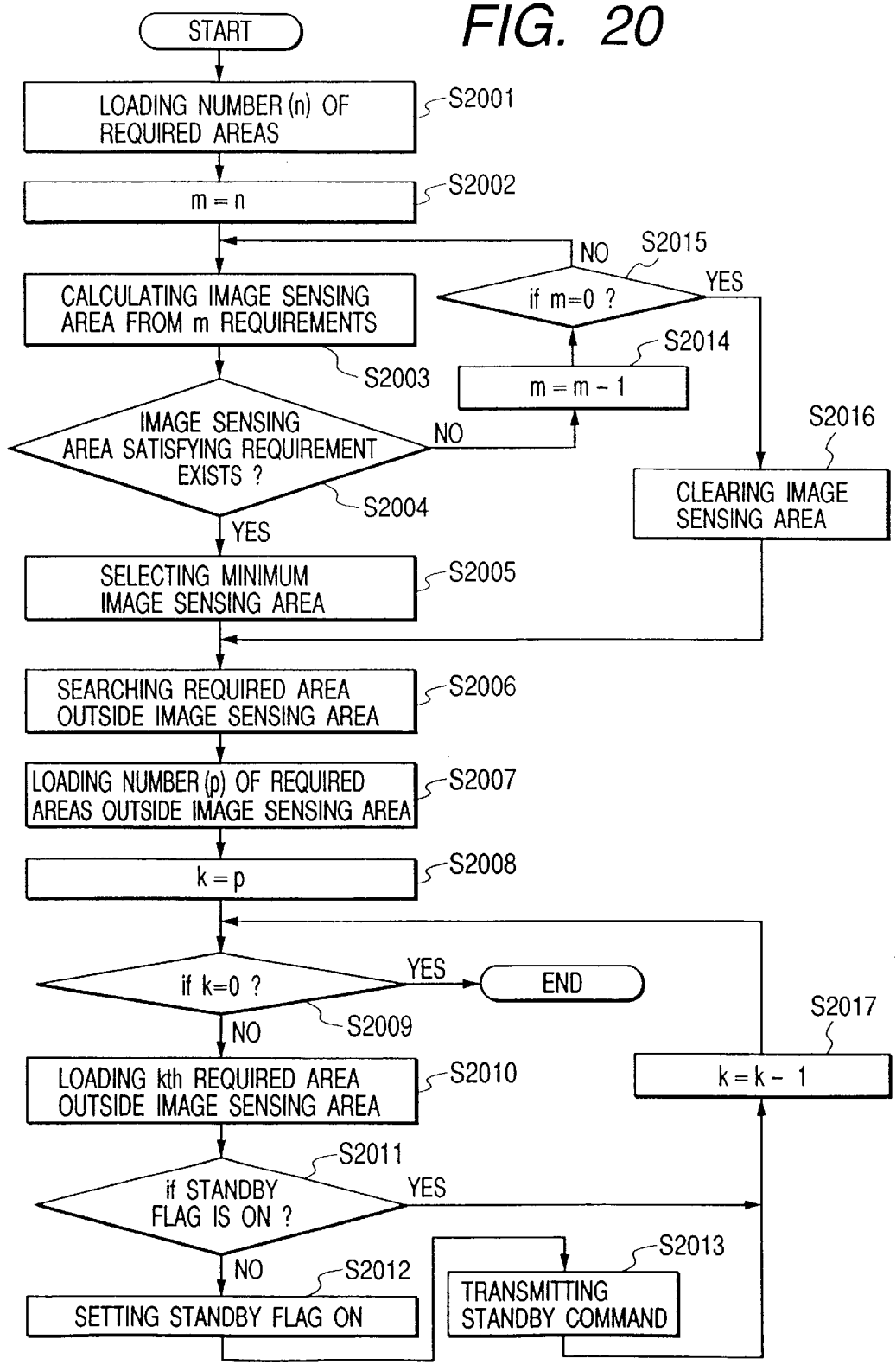
FIG. 20 is a flow chart showing control in the second embodiment, and more specifically, the flow of processing for calculation of an image sensing area at the occurrence of required area addition, deletion, or change.

FIG. 20 is a flow chart showing the flow of processing in calculating an image sensing area in the camera server 100 when a required area is added, deleted, or changed.

In step S2001, the current number of required areas is received. Assume that in the case shown in FIG. 20, the number of required areas is n.

Figure 21:
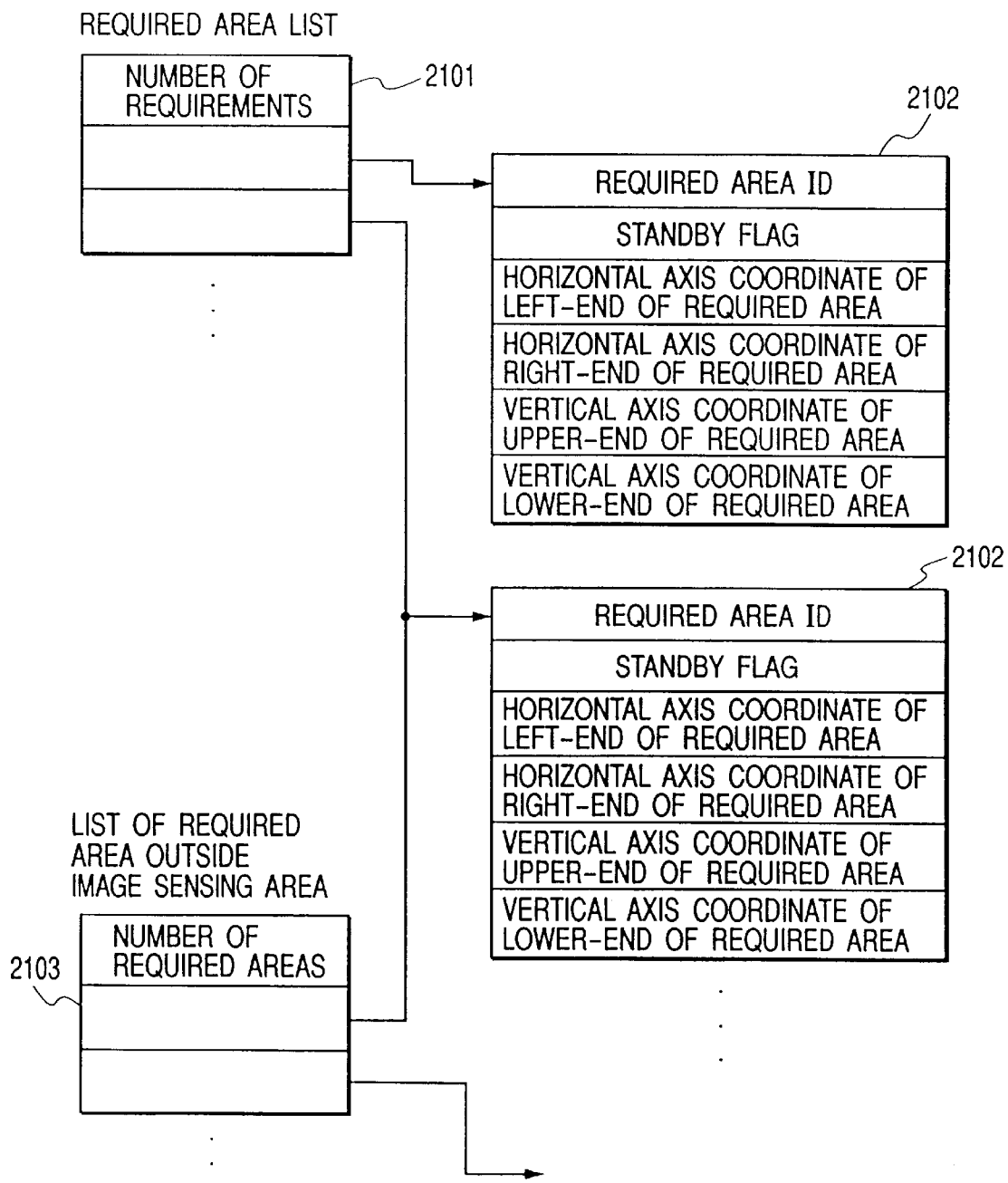
FIG. 21 is a view showing an example of the data structure of a required area storage unit in the second embodiment.

In this embodiment, data about required areas are managed in the form of a list like the one shown in FIG. 21. A required area list 2101 in this embodiment contains the current number of required areas in its head portion. Fields of required area data 2102 corresponding to the number of requirements follow the head portion. A standby flag is added to each field unlike the list shown in FIG. 16.

When a required area is added, the corresponding required area data 2102 is added to the required area list 2101. When a required area is deleted, the corresponding required area data 2102 is deleted from the required area list 2101. When these required areas are added or deleted, the number of requirements in the head portion of the required area list 2101 is updated accordingly. When a required area is changed, the information of the portion corresponding to the designated required area ID is updated.

In addition to the required area list 2101, this embodiment includes a list 2103 of required areas outside the image sensing area, in which the number of required areas outside the image sensing area calculated in the following manner is stored, together with data about these required areas. This list 2103 of required areas outside the image sensing area will be described later.

When the current number of required areas is loaded from the required area list 2101, the loaded number n of required areas is substituted in a variable m in step S2002. In step S2003, the minimum area (image sensing area) including m required areas is calculated. If m<n, image sensing area candidates are calculated for all the combinations given by n×(n−1)×(n−2)×. . . ×(n−m+1) The respective calculation results are stored in a RAM 111. Since the same calculation method as that described with reference to FIGS. 15A and 15B is used to calculate the minimum image sensing area including the m required areas, a description thereof will be omitted.

The camera server 100 searches a plurality of image sensing area candidates calculated in this manner for candidates that can be sensed by controlling the camera, and deletes the remaining candidates from the RAM 111. As a result, only the image-sensible area candidates are left in the RAM 111. It is then checked in step S2004 whether there is any image sensing area that satisfies the requirement, i.e., there is any image sensing area candidate left in the RAM 111.

If YES in step S2004, a candidate having the minimum area is selected from the image sensing area candidates in step S2005. This operation is performed to select a candidate in which each required video image has the highest resolution among the combinations including the same number m of required areas. If it is determined in step S2004 that there is no image sensing area candidate, the value of the variable m is decremented in step S2014. It is then checked instep S2015 whether the value of the variable m is 0. Thereafter, the processing from step 2003 is repeated.

The loop of steps S2003, S2004, S2014, and S2105 is repeated until an image-sensible area candidate appears. If it is determined in step S2105 that the value of the variable m is 0, the image sensing areas are cleared in step 2016. In this case, no image-sensible area can be formed with any combination of required areas, and the information (coordinate value) representing each image sensing area is set to 0. Such a state may occur when there is only one required area, and the area is larger than the area obtained when the camera is zoomed out to the limit.

Figure 22:
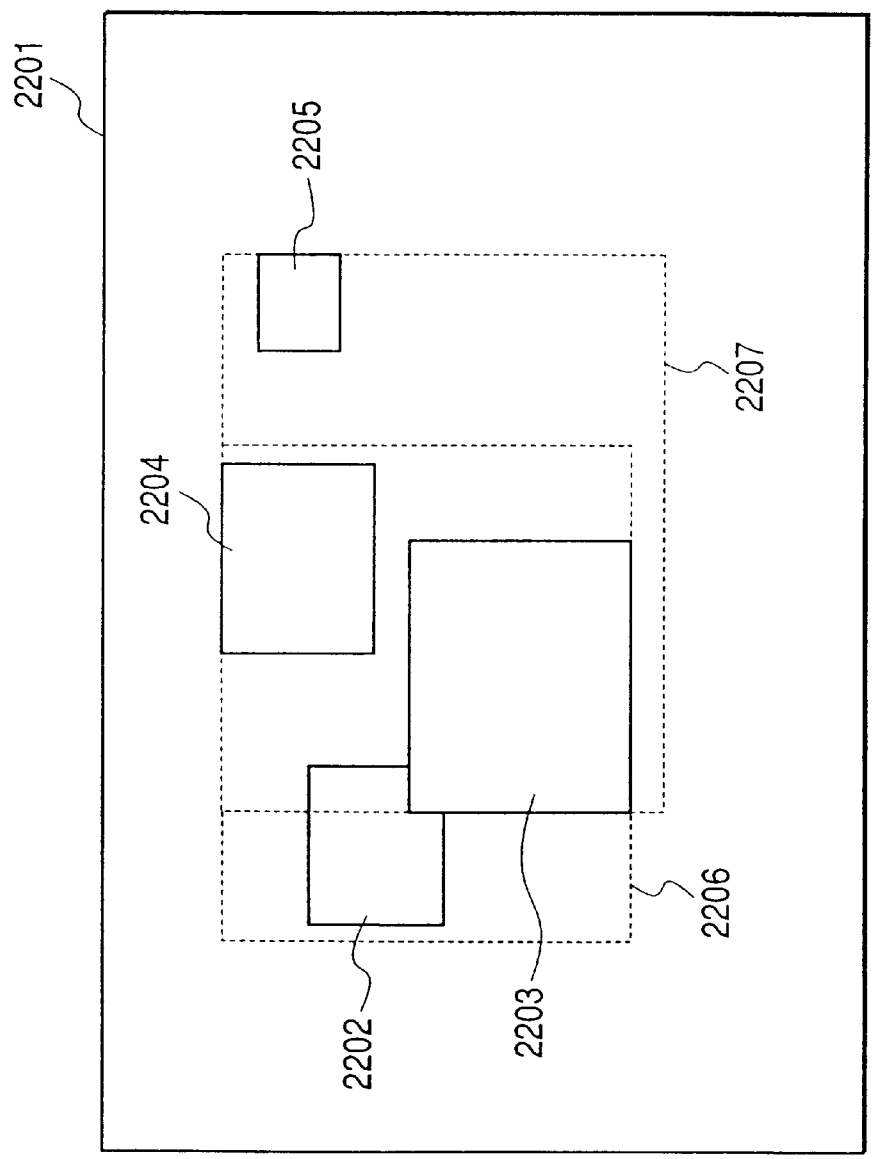
FIG. 22 is a view showing a case wherein image sensing area candidates are selected in the second embodiment.

FIG. 22 is a view showing an example of selection of an image sensing area candidate. A range 2201 represents the limits within which image sensing operation can be performed by panning and tilting the camera. This range includes required areas 2202, 2203, 2204, and 2205 required by the respective clients. When an image sensing area is to be obtained in this state, it is assumed that there is no image sensing area that includes all the four required areas 2202 to 2205 (an image sensing area including all the required areas exceeds the maximum view angle of the camera). Also assume that image sensing areas each including three required areas are obtained like areas 2206 and 2207 indicated by the dotted lines.

One image sensing area candidate 2206 includes the three required areas 2202, 2203, and 2204. The other image sensing area candidate 2207 includes the three required areas 2203, 2204, and 2205. When combinations of three required areas are selected, other combinations are deleted because they exceed the maximum view angle of the camera. When the areas of the two remaining image sensing area candidates 2206 and 2207 are compared with each other, one image sensing area candidate 2206 is smaller. In the case shown in FIG. 22, therefore, the area 2206 is selected as an image sensing area.

When an image sensing area is calculated by the above processing, the flow advances to step S2006 to search for a required area outside the image sensing area and store it in the RAM 111. Data about each required area outside the image sensing area is managed in the form of a list like the one shown in FIG. 21 and added to the list 2103 of required areas outside the image sensing area. Note that the list 2103 of required areas outside the image sensing area is initialized at the start of the processing in step S2006, and the number in the head portion of the list 2103 of required areas outside the image sensing area is incremented every time the required area data 2102 is added to the list 2103 of required areas outside the image sensing area, thus storing the registered number.

In step S2007, the number of required areas registered in the list 2103 of required areas outside the image sensing area is received. Since this number is written in the head portion of the list 2103 of required areas outside the image sensing area, this value is referred to. Assume that this value is p in this embodiment. In step S2008, the value p loaded in step S2007 is substituted in a variable k.

In step S2009, it is checked whether the value of the variable k is 0. If YES in step S2009, since there is no unprocessed required area outside the image sensing area, the processing is terminated. If NO in step S2009, the kth required area data 2102 registered in the list 2103 of required areas outside the image sensing area is loaded in step S2010. That is, the required area data 2102 registered in the last portion of the list 2103 of required areas outside the image sensing area is referred to. In this case, the last (kth) required area data 2102 is deleted from the list 2103 of required areas outside the image sensing area.

In step S2011, it is checked whether the standby flag for the referred required area data 2102 is ON. When a required area addition or change requirement is sent from one of the clients 200, 300, 400, . . . and it is determined that the corresponding required area is outside the image sensing area, this standby flag indicates that the requirement is held. When the required area data 2102 is generated, the standby flag is initialized to "OFF".

When this standby flag is OFF, the standby flag is set ON in step S2012. The flow then advances to step S2013 to form a command for notifying the corresponding one of the clients 200, 300, 400, . . . that the requirement is set in the standby state without being satisfied and to send the command to the corresponding client. In step S2017, the value of the variable k is decremented, and the processing is repeated from step S2009.

If it is determined in step S2011 that the standby flag is ON, since the currently referred required area has already been in the standby state, the flow advances to step S2017 without performing the processing in steps S2012 and S2103. The processing is then repeated from step S2009.

Although not shown, in the processing in step S2006 of searching for a required area outside the image sensing area, the standby flag for the required area data 2102 about each required area determined as an area inside the image sensing area is set OFF.

As described above, according to the method of calculating the minimum image sensing area satisfying the maximum number of requirements of all the required areas in the second embodiment, every time the contents of a requirement from each client are changed, an image sensing area that satisfies the maximum number of requirements and can provide the optimal image quality can be selected according to the circumstances. This can efficiently satisfy the maximum number of requirements.

The third embodiment of the present invention will be described next, in which the positional distribution of required areas is determined to sense an area on which requirements concentrate.

Note that a method of designating required areas in clients 200, 300, 400, . . . , a method of adding, deleting, and changing required areas in a camera server 100, and a camera control method are the same as those in the first embodiment, and hence a description thereof will be omitted.

Figure 23:
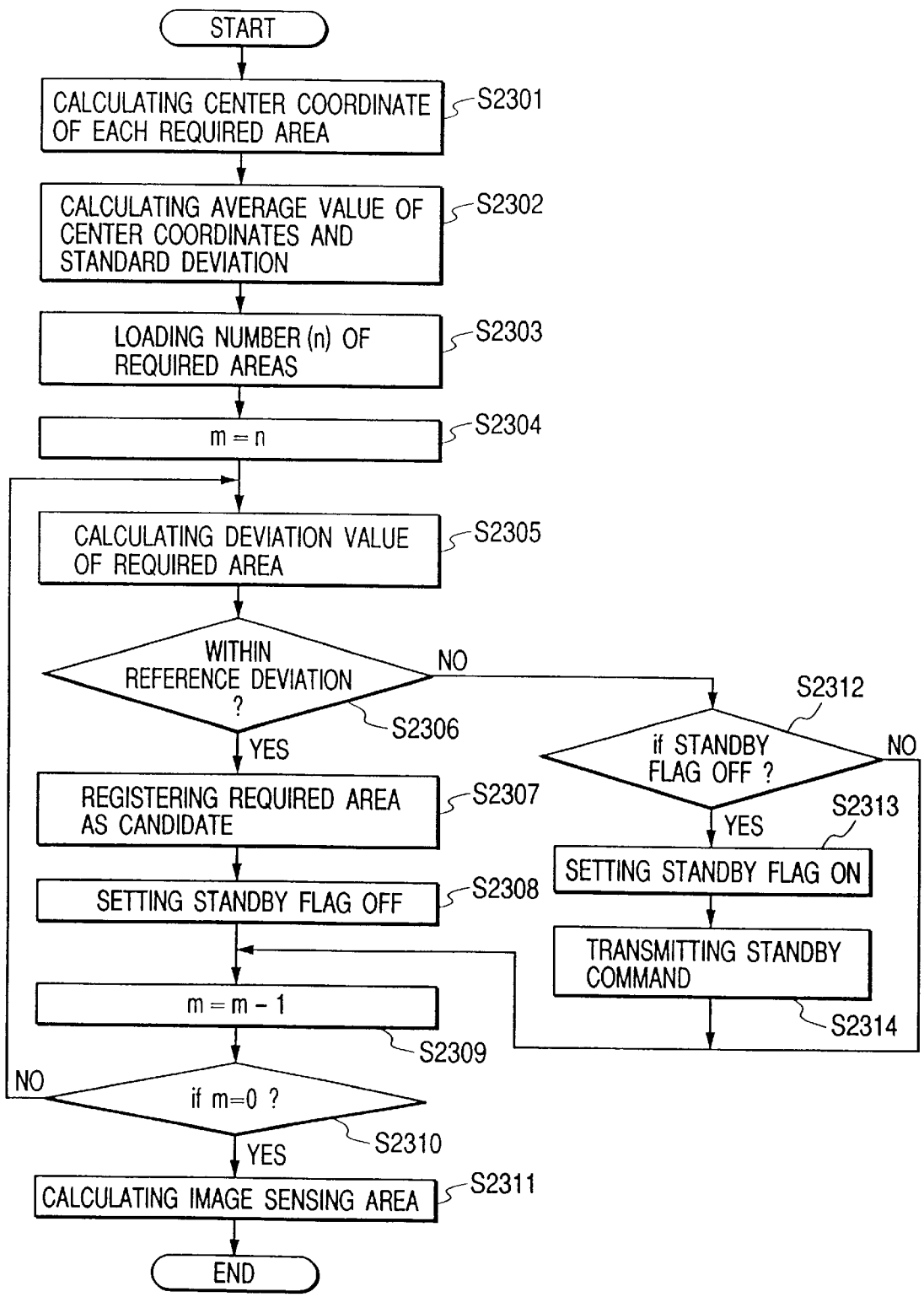
FIG. 23 is a flow chart showing control in the third embodiment, and more specifically, the flow of processing for calculation of an image sensing area at the occurrence of required area addition, deletion, or change.

FIG. 23 is a flow chart showing the flow of processing in a case wherein an image sensing area is calculated when a required area is added, deleted, or changed.

Figure 25:
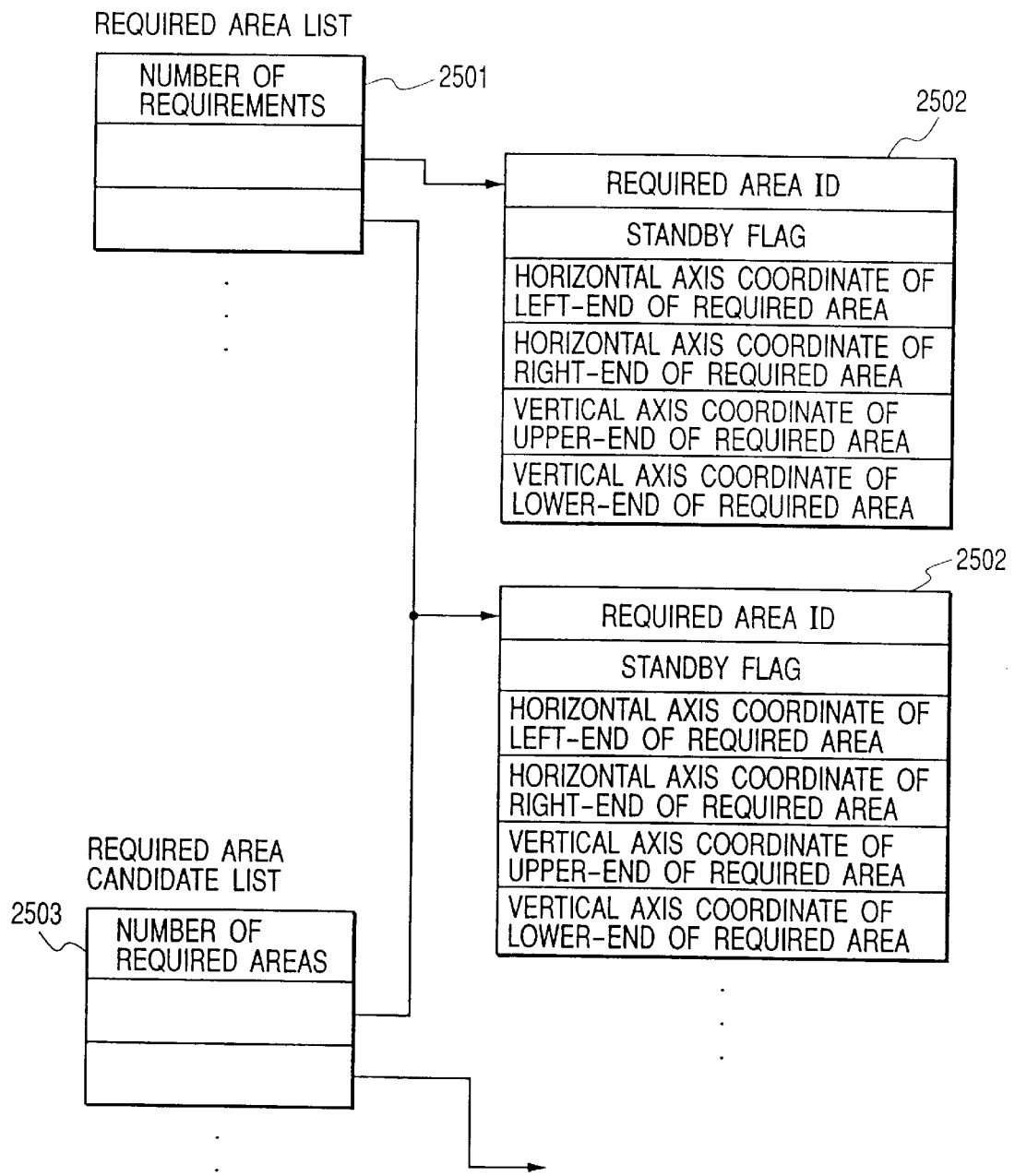
FIG. 25 is a view showing an example of the data structure of a required area storage unit in the third embodiment.

Referring to FIG. 23, in step S2301, the center coordinates (direction) of each required area are obtained. Data about each required area is managed in the form of a list like the one shown in FIG. 25 (the same as that shown in FIG. 21 except for a required area candidate list 2503) and stored as required area data 2502. The center coordinates of each required area are obtained from the horizontal axis coordinate of the left end, horizontal axis coordinate of the right end, vertical axis coordinate of the upper end, and vertical axis coordinate of the lower end written in the required area data 2502.

In step S2302, the average value of the center coordinates of the respective required areas obtained in step S2301 and a standard deviation are calculated. In step S2303, the current number of required areas is loaded. Note that the number of required areas is managed in the head portion of a required area list 2501 shown in FIG. 25. When a required area is added, the required area data 2502 is added to the required area list 2501. When a required area is deleted, the required area data 2502 is deleted from the required area list 2501. When a required area is changed, the information of the portion corresponding to the designated required area ID is updated.

Figure 24:
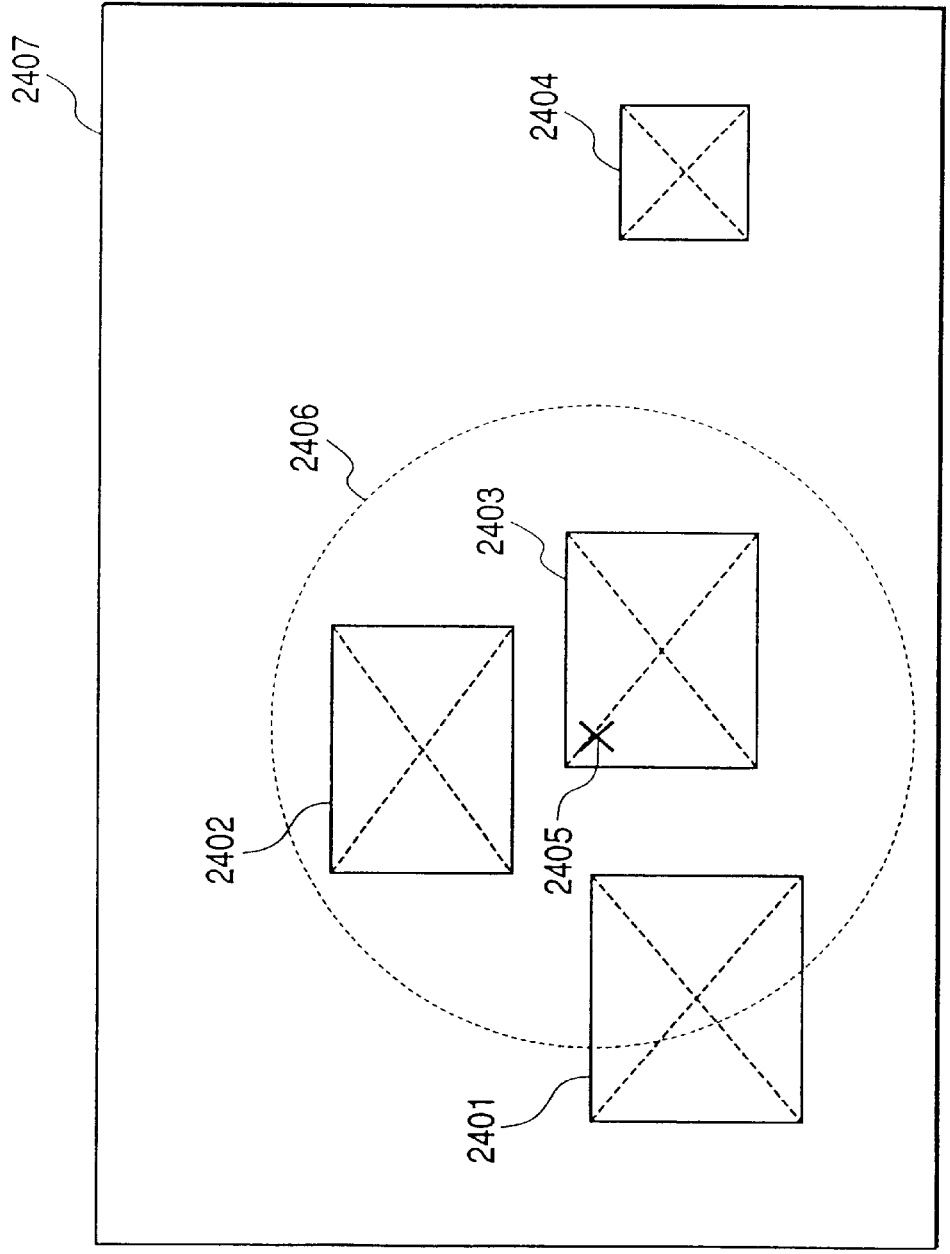
FIG. 24 is a view showing a case wherein image sensing area candidates are selected in the third embodiment.

In step S2304, the loaded number n of required areas is substituted in a variable m. In step S2305, the deviation of the center coordinates of the mth required area is calculated. This value is calculated on the basis of the standard deviation calculated in step S2302. In step S2306, it is checked whether the calculated deviation falls within a standard deviation range. FIG. 24 shows this state.

FIG. 24 shows required areas 2401, 2402, 2403, and 2404 and an average value 2405 of the center coordinates of the respective required areas 2401 to 2404. A standard deviation range 2406 from the average value 2405 of the center coordinates is indicated by the circle having a designated deviation amount as a radius. A range 2407 represents the limits within which image sensing operation can be performed by panning and tilting the camera.

A supplied standard deviation amount is loaded from a ROM 110 or external storage unit (not shown) into a RAM 111 at the start-up of the system or designated by an input from the user. Since the deviation amount varies depending on the performance (the maximum pan and tilt angles and the zoom magnification range), a standard deviation amount is set depending on the camera to be used. In the case shown in FIG. 24, the deviation values of the center coordinates of the required areas 2401, 2402, 2403, and 2404 fall within the standard deviation range 2406, and the deviation value of the required area 2404 falls outside the standard deviation range 2406.

If it is determined in step S2306 that the deviation value of the center coordinates of the mth required area falls within the standard deviation range, the mth required area is registered as a candidate in step S2307. The required area candidate is added by registering a pointer indicating the required area data 2502 in the required area candidate list 2503 in FIG. 25. In step S2308, the standby flag for the required area data 2502 is set OFF.

If it is determined in step S2306 that the mth required area does not fall within the standard deviation range, it is checked in step S2312 whether the standby flag for the mth required area data 2502 is OFF. If YES in step S2312, the standby flag for the mth required area data 2502 is set ON in step S2313.

In step S2314, the camera server 100 forms a command for notifying the corresponding one of the clients 200, 300, 400, . . . that the requirement is set in the standby state without being satisfied and transmits the command to the corresponding client. If it is determined in step S2312 that the standby flag is ON, the processing in steps S2313 and S2314 is not performed.

When the processing in step S2308, S2312, S2314 is complete, the value of the variable m is decremented in step S2309. It is then checked in step S2310 whether the value of the variable m is 0. If it is determined that the value of the variable m is not 0, since an unprocessed required area is left, the processing is repeated from step S2305.

If the value of the variable m is 0, since the above processing is performed for all the required areas, an image sensing area is calculated in step S2311. This image sensing area is calculated on the basis of the required area data 2502 registered in the required area candidate list 2503. That is, the minimum area including all the required area candidates is calculated as an image sensing area.

As described above, according to the third embodiment, every time a client adds, deletes, or change a required area, an image sensing area is determined depending on whether the deviation value of the center coordinates of each required area falls within the standard deviation range, thereby selecting a portion on which required areas concentrate most as an image sensing area.

In addition, if a plurality of requirements are satisfied and required areas outside the image sensing area are managed with standby flags and standby notification commands as in the second embodiment, operation right management which can simultaneously satisfy a plurality of requirements can be realized.

Figure 26:
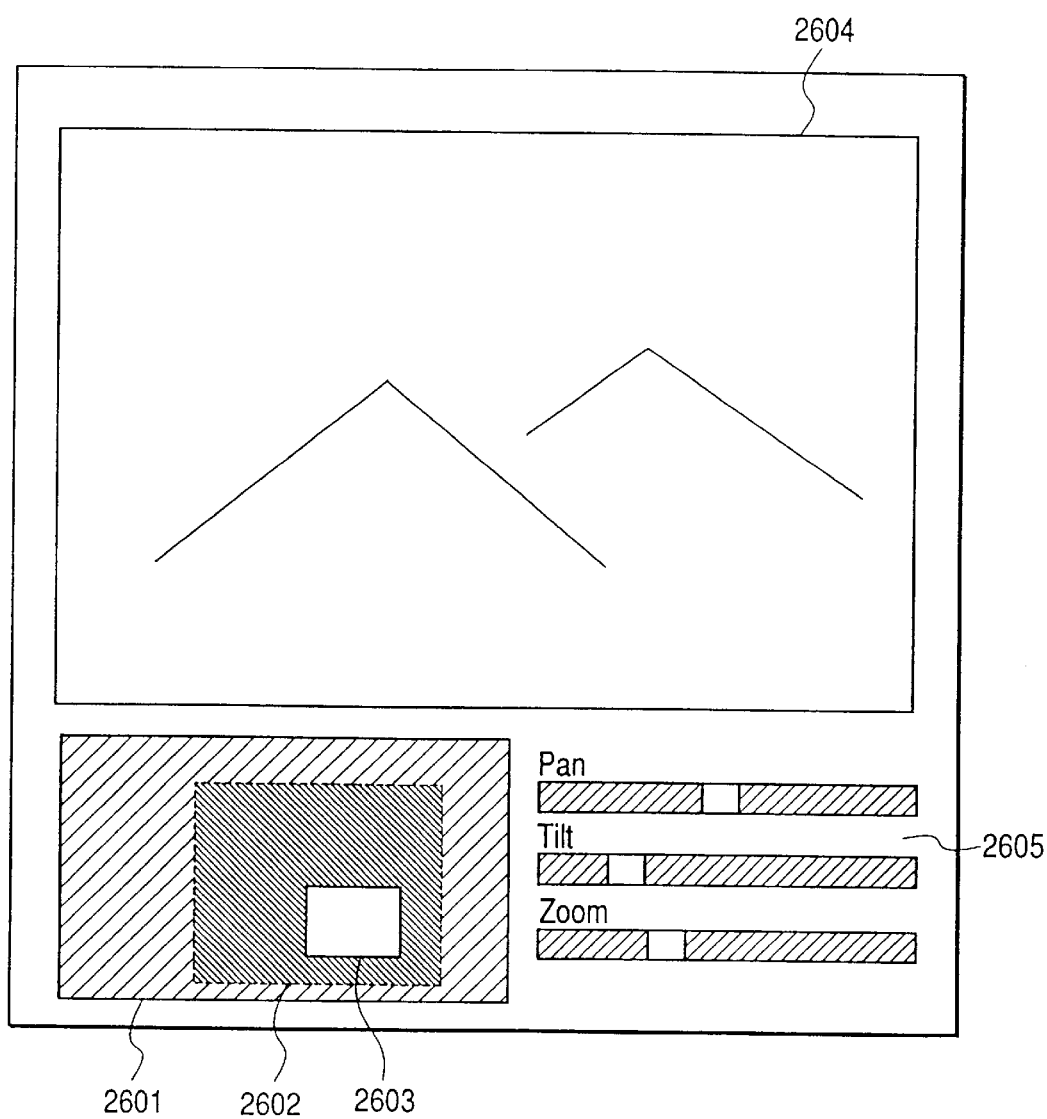
FIG. 26 is a view showing an example of a GUI window on a client in the second and third embodiments.

An example of a window used for operation right management which can simultaneously satisfy a plurality of requirements as in the second and third embodiments will be described below. FIG. 26 shows an example of a window displayed on each of the clients 200, 300, 400, . . . . FIG. 26 shows an image-sensible range 2601 of the camera server 100 and an actual image sensing area 2602 that is currently sensed by the camera. Note that information about the area currently sensed by the camera is loaded from the camera server 100.

FIG. 26 also shows a required area 2603 required by the self-client, a required video image 2604 of the area required by the client user, and an operation panel 2605 (scroll bar) for controlling the camera to change the position and size of the required area 2603.

If the required area 2603 is designated within the image sensing area 2602 of the camera on each of the clients 200, 300, 400, . . . , since the requirement is not held in the standby state, the user can freely operate the required area 2603. That is, in designating the required area 2603, display of the image sensing area 2602, which is the range in which a video image can be reliably obtained upon designation of a required area, realizes a state in which the user obtains the right to operate a required area within the image sensing area 2602.

In addition, if the user designates the required area 2603 outside the image sensing area 2602, the required area is determined as an area outside the image sensing area, and the required video image may not be obtained as described in the second or third embodiment. However, a standby notification command is transmitted from the camera server 100. Therefore, the client user, who sees the command, chooses between staying in the standby state, changing the requirement, and canceling the requirement.

The objects of the above-described embodiments are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus. In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

When each embodiment is applied to the above recording medium, program codes corresponding to the flow charts described above are stored in the recording medium. In brief, modules indispensable for the camera control system of the present invention are stored in the recording medium.

As in the above embodiments, only the minimum area including all the required areas required by the =respective users is sensed, and the video images of the respective required areas are extracted from the sensed video image and distributed to the respective users. This allows a plurality of users to simultaneously pseudo-control geometric parameters for the camera so as to obtain video images at desired direction and view angles of the camera. In addition, since only one camera is used in this case, the cost required to construct a system can be suppressed low. Furthermore, since the electronic zoom magnification of each required video image to be distributed can be suppressed low as compared with a case wherein a video image is sensed at the maximum view angle of the camera, a deterioration in the image quality of a required video image, which cannot be prevented by the conventional method, can be minimized.

According to another feature of the above embodiments, only the minimum area satisfying the maximum number of requirements within the image-sensible range, of the required areas required by a plurality of users, is sensed, and the video images of the respective required areas are cut from the sensed video image and distributed to the respective users. Therefore, every time the contents of the requirement from each user change, image sensing operation can be performed upon selection of an image sensing area which satisfies the maximum number of requirements, together with a view angle at which the optimal image quality can be provided, according to the circumstances. This can efficiently satisfy the maximum number of requirements.

According to still another feature of the above embodiments, only the minimum area including required areas whose statistical values fall within the range determined in accordance with the statistical information of each required area, of the required areas required by a plurality of users, is sensed, and the video images of the respective required areas are extracted from the sensed video image and distributed to the respective user terminals. Therefore, every time each user adds, deletes, or changes a required area, a portion on which requirements concentrate most can be selected as an image sensing area, thereby efficiently managing the image sensing area.

Many widely different embodiment of the present invention may be constructed without departing from the spirit and scope of the present invention. It should be understood that the present invention is not limited to the specific embodiments described in the specification, except as defined in the appended claims.

What is claimed is:

1. An image distributing system for distributing images from a camera at least one of whose panning, tilting, and zooming can be controlled through a network, comprising:

a receiving unit which receives information about an image sensing area of said camera which is required by each of a plurality of client terminals;

a control unit which controls said camera to include the image sensing areas of said camera which are required from said respective terminals, wherein said control unit calculates an image sensing direction in which the image sensing area of said camera which is required from each of said client terminals is included, and controls panning and/or tilting of said camera in accordance with the calculated image sensing direction; and a distributing unit which extracts images of the image sensing areas of said camera which are required from said respective client terminals, from an image sensed by said camera controlled by said control unit and distributing the extracted images to said respective client terminals.

2. A system according to claim 1, further comprising a transmission unit which, when there is a client terminal whose required image sensing area is not included in the image sensing area of said camera which is controlled by said control means, transmits information indicating an error to said client terminal.

3. An image distributing system for distributing images from a camera at least one of whose panning, tilting, and zooming can be controlled, through a network, comprising:

a receiving unit which receives information about an image sensing area of said camera which is required by each of a plurality of client terminals;

a control unit which controls said camera to include the image sensing areas of said camera which are required from said respective client terminals, wherein said control unit calculates a minimum view angle in which the image sensing area of said camera which is required from each of said client terminals is included, and controls zooming of said camera in accordance with the calculated view angle; and a distributing unit which extracts images of the image sensing areas of said camera which are required from said respective client terminals, from an image sensed by said camera controlled by said control unit and distributing the extracted images to said respective client terminals.

4. An image distributing system for distributing images from a camera at least one of whose panning, tilting, and zooming can be controlled, through a network, comprising:

a receiving unit which receives information about an image sensing area of said camera which is required by each of a plurality of client terminals;

a control unit which controls said camera to include the image sensing areas of said camera which are required from said respective client terminals, wherein said control unit controls said camera such that the image sensing areas of said camera which are required from the maximum number of client terminals, of the image sensing areas of said camera which are required from said respective client terminals, are included in a zooming range in which said camera can be driven, when all the image sensing areas of said camera which are required from said respective client terminals cannot be included in the zooming range of said camera; and a distributing unit which extracts images of the image sensing areas of said camera which are required from said respective client terminals, from an image sensed by said camera controlled by said control unit and distributing the extracted images to said respective client terminals.

5. A system according to claim 4, wherein said control unit calculates a minimum view angle in which the image sensing areas of said camera which are required from the maximum number of client terminals are included within the zooming range of said camera, and controls zooming of said camera in accordance with the calculated view angle.

6. A system according to claim 5, wherein when a plurality of combinations of the image sensing areas of said camera required from the maximum number of client terminals are included in the zooming range of said camera, said control unit selects a combination, of the combinations, with which a minimum view angle is set, and controls said camera in accordance with the minimum view angle including the selected combination of the image sensing areas.

7. An image distributing system for distributing images from a camera at least one of whose panning, tilting, and zooming can be controlled, through a network, comprising:

a receiving unit which receives information about an image sensing area of said camera which is required by each of a plurality of client terminals;

a control unit which controls said camera to include the image sensing areas of said camera which are required from said respective client terminals, wherein said control unit controls said camera to include the image sensing areas, of the image sensing areas of said camera which are required from said respective client terminals, which exist in a range determined in accordance with statistical information of the required image sensing areas of said camera; and a distributing unit which extracts images of the image sensing areas of said camera which are required from said respective client terminals, from an image sensed by said camera controlled by said control unit and distributing the extracted images to said respective client terminals.

8. A system according to claim 7, wherein said control unit calculates a minimum view angle in which the image sensing areas existing in the range determined in accordance with the statistical information of the image sensing areas of said camera are included, and controls zooming of said camera in accordance with the calculated view angle.

9. An image distributing system for distributing images from a camera at least one of whose panning, tilting, and zooming can be controlled, through a network, comprising:

a receiving unit which receives information about an image sensing area of said camera which is required by each of a plurality of client terminals;

a control unit which controls said camera to include the image sensing areas of said camera which are required from said respective client terminals;

a distributing unit which extracts images of the image sensing areas of said camera which are required from said respective client terminals, from an image sensed by said camera controlled by said control unit and distributing the extracted images to said respective client terminals; and a transmission unit which, when the image sensing area of said camera which is newly required information received by said receiving unit is not included in a current image sensing area of said camera, transmits information indicating that the requirement is in a standby state to a client sending the newly-required information.

10. An image distributing method of distributing images from a camera at least one of whose panning, tilting, and zooming can be controlled, through a network, comprising:

a receiving step of receiving information about an image sensing area of said camera which is required by each of a plurality of client terminals;

a control step of controlling said camera to include the image sensing areas of said camera which are required from said respective client terminals, wherein the control step includes a step of calculating an image sensing direction in which the image sensing area of said camera which is required from each of said client terminals is included, and a step of controlling panning and/or tilting of said camera in accordance with the calculated image sensing direction; and a distributing step of extracting images of the image sensing areas of said camera which are required from said respective client terminals, from an image sensed by said camera controlled in the control step and distributing the cut images to said respective client terminals.

11. A method according to claim 10, further comprising a transmission step of, when there is a client terminal whose required image sensing area is not included in the image sensing area of said camera which is controlled in the control step, transmitting information indicating an error to said client terminal.

12. An image distributing method of distributing images from a camera at least one of whose panning, tilting, and zooming can be controlled, through a network, comprising:

a receiving step of receiving information about an image sensing area of said camera which is required by each of a plurality of client terminals;

a control step of controlling said camera to include the image sensing areas of said camera which are required from said respective client terminals, wherein the control step includes a step of calculating a minimum view angle in which the image sensing area of said camera which is required from each of said client terminals is included, and a step of controlling zooming of said camera in accordance with the calculated view angle; and a distributing step of extracting images of the image sensing areas of said camera which are required from said respective client terminals, from an image sensed by said camera controlled in the control step and distributing the cut images to said respective client terminals.

13. An image distributing method of distributing images from a camera at least one of whose panning, tilting, and zooming can be controlled, through a network, comprising:

a receiving step of receiving information about an image sensing area of said camera which is required by each of a plurality of client terminals;

a control step of controlling said camera to include the image sensing areas of said camera which are required from said respective client terminals, wherein the control step includes a step of controlling said camera such that the image sensing areas of said camera which are required from the maximum number of client terminals, of the image sensing areas of said camera which are required from said respective client terminals, are included in a zooming range in which said camera can be driven, when all the image sensing areas of said camera which are required from said respective client terminals cannot be included in the zooming range of said camera; and a distributing step of extracting images of the image sensing areas of said camera which are required from said respective client terminals, from an image sensed by said camera controlled in the control step and distributing the cut images to said respective client terminals.

14. A method according to claim 13, wherein the control step includes a step of calculating a minimum view angle in which the image sensing areas of said camera which are required from the maximum number of client terminals are included within the zooming range of said camera, and a step of controlling zooming of said camera in accordance with the calculated view angle.

15. A method according to claim 14, wherein the control step includes a step of, when a plurality of combinations of the image sensing areas of said camera required from the maximum number of client terminals are included in the zooming range of said camera, selecting a combination, of the combinations, with which a minimum view angle is set, and a step of controlling said camera in accordance with the minimum view angle including the selected combination of the image sensing areas.

16. An image distributing method of distributing images from a camera at least one of whose panning, tilting, and zooming can be controlled, through a network, comprising:

a receiving step of receiving information about an image sensing area of said camera which is required by each of a plurality of client terminals;

a control step of controlling said camera to include the image sensing areas of said camera which are required from said respective client terminals, wherein the control step includes a step of controlling said camera to include the image sensing areas, of the image sensing areas of said camera which are required from said respective client terminals, which exist in a range determined in accordance with statistical information of the required image sensing areas of said camera; and a distributing step of extracting images of the image sensing areas of said camera which are required from said respective client terminals, from an image sensed by said camera controlled in the control step and distributing the cut images to said respective client terminals.

17. A method according to claim 16, wherein the control step includes a step of calculating a minimum view angle in which the image sensing areas existing in the range determined in accordance with the statistical information of the image sensing areas of said camera are included, and a step of controlling zooming of said camera in accordance with the calculated view angle.

18. An image distributing method of distributing images from a camera at least one of whose panning, tilting, and zooming can be controlled, through a network, comprising:

a receiving step of receiving information about an image sensing area of said camera which is required by each of a plurality of client terminals;

a control step of controlling said camera to include the image sensing areas of said camera which are required from said respective client terminals;

a distributing step of extracting images of the image sensing areas of said camera which are required from said respective client terminals, from an image sensed by said camera controlled in the control step and distributing the cut images to said respective client terminals; and a transmission step of, when the image sensing area of said camera which is newly required information received in the receiving step is not included in a current image sensing area of said camera, transmitting information indicating that the requirement is in a standby state to a client sending the newly-required information.

19. A recording medium for computer-readably storing a program for executing an image distributing method of distributing images from a camera at least one of whose panning, tilting and zooming can be controlled, through a network, said image distributing method comprising:

a receiving step of receiving information about an image sensing area of a camera which is required by each of a plurality of client terminals;

a control step of controlling said camera to include the image sensing areas of said camera which are required from said respective client terminals, wherein the control step includes a step of calculating an image sensing direction in which the image sensing area of said camera which is required from each of said client terminals is included, and a step of controlling panning and/or tilting of said camera in accordance with the calculated image sensing direction; and a distributing step of extracting images of the image sensing areas of said camera which are required from said respective client terminals, from an image sensed by said camera controlled in the control step and distributing the extracted images to said respective client terminals.

20. A medium according to claim 19, further comprising a transmission step of, when there is a client terminal whose required image sensing area is not included in the image sensing area of said camera which is controlled in the control step, transmitting information indicating an error to said client terminal.

21. A recording medium for computer-readably storing a program for executing an image distributing method of distributing images from a camera at least one of whose panning, tilting and zooming can be controlled, through a network, said image distributing method comprising:

a receiving step of receiving information about an image sensing area of a camera which is required by each of a plurality of client terminals;

a control step of controlling said camera to include the image sensing areas of said camera which are required from said respective client terminals, wherein the control step includes a step of calculating a minimum view angle in which the image sensing area of said camera which is required from each of said client terminals is included, and a step of controlling zooming of said camera in accordance with the calculated view angle; and a distributing step of extracting images of the image sensing areas of said camera which are required from said respective client terminals, from an image sensed by said camera controlled in the control step and distributing the extracted images to said respective client terminals.

22. A recording medium for computer-readably storing a program for executing an image distributing method of distributing images from a camera at least one of whose panning, tilting and zooming can be controlled, through a network, and image distributing method comprising:

a receiving step of receiving information about an image sensing area of a camera which is required by each of a plurality of client terminals;

a control step of controlling said camera to include the image sensing areas of said camera which are required from said respective client terminals, wherein the control step includes a step of controlling said camera such that the image sensing areas of said camera which are required from the maximum number of client terminals, of the image sensing areas of said camera which are required from said respective client terminals, are included in a zooming range in which said camera can be driven, when all the image sensing areas of said camera which are required from said respective client terminals cannot be included in the zooming range of said camera; and a distributing step of extracting images of the image sensing areas of said camera which are required from said respective client terminals, from an image sensed by said camera controlled in the control step and distributing the extracted images to said respective client terminals.

23. A medium according to claim 22, wherein the control step includes a step of calculating a minimum view angle in which the image sensing areas of said camera which are required from the maximum number of client terminals are included within the zooming range of said camera, and a step of controlling zooming of said camera in accordance with the calculated view angle.

24. A medium according to claim 23, wherein the control step includes a step of, when a plurality of combinations of the image sensing areas of said camera required from the maximum number of client terminals are included in the zooming range of said camera, selecting a combination, of the combinations, with which a minimum view angle is set, and a step of controlling said camera in accordance with the minimum view angle including the selected combination of the image sensing areas.

25. A recording medium for computer-readably storing a program for executing an image distributing method of distributing images from a camera at least one of whose panning, tilting and zooming can be controlled, through a network, said image distributing method comprising:

a receiving step of receiving information about an image sensing area of a camera which is required by each of a plurality of client terminals;

a control step of controlling said camera to include the image sensing areas of said camera which are required from said respective client terminals, wherein the control step includes a step of controlling said camera to include the image sensing areas, of the image sensing areas of said camera which are required from said respective client terminals, which exist in a range determined in accordance with statistical information of the required image sensing areas of said camera; and a distributing step of extracting images of the image sensing areas of said camera which are required from said respective client terminals, from an image sensed by said camera controlled in the control step and distributing the extracted images to said respective client terminals.

26. A medium according to claim 25, wherein the control step includes a step of calculating a minimum view angle in which the image sensing areas existing in the range determined in accordance with the statistical information of the image sensing areas of said camera are included, and a step of controlling zooming of said camera in accordance with the calculated view angle.

27. A recording medium for computer-readably storing a program for executing an image distributing method of distributing, images from a camera at least one of whose panning, tilting and zooming can be controlled, through a network, said image distributing method comprising:

a receiving step of receiving information about an image sensing area of a camera which is required by each of a plurality of client terminals;

a control step of controlling said camera to include the image sensing areas of said camera which are required from said respective client terminals;

a distributing step of extracting images of the image sensing areas of said camera which are required from said respective client terminals, from an image sensed by said camera controlled in the control step and distributing the extracted images to said respective client terminals; and a transmission step of, when the image sensing area of said camera which is newly required information received in the receiving step is not included in a current image sensing area of said camera, transmitting information indicating that the requirement is in a standby state to a client sending the newly-required information.

* * * * *

UNITED STATES PATENT AND TRADEMARK OFFICE
CERTIFICATE OF CORRECTION

PATENT NO. : 6,727,940 B1
DATED : April 27, 2004
INVENTOR(S) : Hiroto Oka et al.

It is certified that error appears in the above-identified patent and that said Letters Patent is hereby corrected as shown below:

Column 3,
Line 49, delete "to is embodiment" and insert -- to this embodiment --.

Column 8,
Line 24, delete "step 308" and insert -- step S308 --.
Line 29, delete "step S307" and insert -- step S309 --.

Column 19,
Line 2, delete "the =respective" and insert -- the respective --.

Signed and Sealed this

Fourteenth Day of March, 2006

JON W. DUDAS
*Director of the United States Patent and Trademark Office*